US012562783B2

(12) United States Patent     (10) Patent No.:   US 12,562,783 B2

Huang     (45) Date of Patent:    Feb. 24, 2026

(54) DIVERSITY TRANSMISSION METHOD, TERMINAL, AND NETWORK-SIDE DEVICE

(71) Applicant: VIVO MOBILE COMMUNICATION CO., LTD., Dongguan (CN)

(72) Inventor: Wei Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 41 days.

(21) Appl. No.: 18/737,896

(22) Filed: Jun. 7, 2024

(65) Prior Publication Data

US 2024/0333342 A1     Oct. 3, 2024

Related U.S. Application Data

(63) Continuation of application No. PCT/CN2022/136286, filed on Dec. 2, 2022.

(30) Foreign Application Priority Data

Dec. 7, 2021    (CN) .......................... 202111484934.3

(51) Int. Cl.
    *H04B 7/04*       (2017.01)
    *H04B 7/06*       (2006.01)
    *H04L 1/00*       (2006.01)

(52) U.S. Cl.
    CPC ....... *H04B 7/04026* (2023.05); *H04B 7/0639* (2013.01); *H04L 1/0057* (2013.01)

(58) Field of Classification Search
    CPC .. H04B 7/04026; H04B 7/04013; H04B 7/04; H04B 7/0413; H04B 7/0456;

(Continued)

(56) References Cited

U.S. PATENT DOCUMENTS

| | | | |
|---|---|---|---|
| 2004/0252779 A1 | 12/2004 | Rouquette et al. | |
| 2008/0304593 A1* | 12/2008 | Khan ....................... | H04B 7/12 |
| | | | 375/267 |

(Continued)

FOREIGN PATENT DOCUMENTS

| | | |
|---|---|---|
| CN | 101494488 A | 7/2009 |
| CN | 108880644 A | 11/2018 |
| CN | 109842463 A | 6/2019 |

OTHER PUBLICATIONS

Partial Supplementary European Search Report issued in related European Application No. 22903334.5, mailed Feb. 11, 2025, 11 pages.

(Continued)

*Primary Examiner* — Khanh C Tran

(74) *Attorney, Agent, or Firm* — IPX PLLC

(57) ABSTRACT

A diversity transmission method, a terminal, and a network-side device are provided. The diversity transmission method includes: determining, by a terminal, a target encoded codeword; and performing, by the terminal, diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

18 Claims, 18 Drawing Sheets

12

Network-side device

11

11

Terminal

Terminal

(58) Field of Classification Search
CPC .. H04B 7/0478; H04B 7/0482; H04B 7/0481;
H04B 7/0639; H04L 1/0057; H04L
1/0058
See application file for complete search history.

(56) References Cited

U.S. PATENT DOCUMENTS

| | | | |
|---|---|---|---|
| 2010/0067512 A1* | 3/2010 | Nam | H04L 5/0023 |
| | | | 375/267 |
| 2010/0104037 A1 | 4/2010 | George et al. | |
| 2010/0182988 A1* | 7/2010 | Roh | H04L 5/0053 |
| | | | 370/342 |
| 2019/0334591 A1* | 10/2019 | Liu | H04L 5/0048 |
| 2020/0389255 A1* | 12/2020 | Harrison | H04L 1/08 |

OTHER PUBLICATIONS

He Chen et al: "A Simple, High-Performance Space-Time Code for
MIMO Backscatter Communications", IEEE Internet of Things
Journal, IEEE, USA, vol. 7, No. 4, Feb. 11, 2020, pp. 3586-3591,
XP011783825.
Extended European Search Report issued in related European
Application No. 22903334.5, mailed May 7, 2025, 10 pages.
First Office Action issued in related Chinese Application No.
202111484934.3, mailed Mar. 17, 2025, 10 pages.
International Search Report and Written Opinion issued in corre-
sponding International Application No. PCT/CN2022/136286, mailed
Feb. 24, 2023, 11 pages.

* cited by examiner

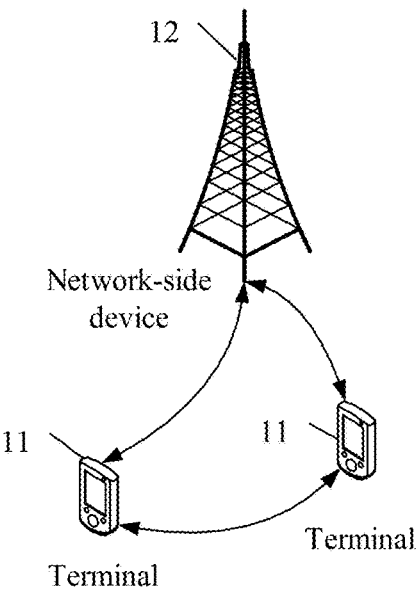

Network-side
device

Terminal

Terminal

FIG. 1

| | |
|---|---|
| A terminal determines a target encoded codeword | 201 |

| | |
|---|---|
| The terminal performs diversity transmission based on the target encoded codeword, where the target encoded codeword meets a target encoding structure; the target encoded codeword is an encoding matrix with N×N dimensions; $N = 2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices | 202 |

FIG. 2

| 0000 | Antenna1 | Antenna2 | Antenna3 | Antenna4 |
|---|---|---|---|---|
| t | $\lvert\Gamma\rvert e^{j\theta}$ | $\lvert\Gamma\rvert e^{j\theta}$ | $\lvert\Gamma\rvert e^{j\theta}$ | $\lvert\Gamma\rvert e^{j\theta}$ |
| t+T | $\lvert\Gamma\rvert e^{-j\theta}$ | $\lvert\Gamma\rvert e^{j-(\theta+\pi)}$ | $\lvert\Gamma\rvert e^{-j\theta}$ | $\lvert\Gamma\rvert e^{j-(\theta+\pi)}$ |
| T+2T | $\lvert\Gamma\rvert e^{j\theta}$ | $\lvert\Gamma\rvert e^{j\theta}$ | $\lvert\Gamma\rvert e^{j\theta}$ | $\lvert\Gamma\rvert e^{j\theta}$ |
| T+3T | $\lvert\Gamma\rvert e^{-j\theta}$ | $\lvert\Gamma\rvert e^{j-(\theta+\pi)}$ | $\lvert\Gamma\rvert e^{-j\theta}$ | $\lvert\Gamma\rvert e^{j-(\theta+\pi)}$ |
| 0100 | Antenna1 | Antenna2 | Antenna3 | Antenna4 |
| t | $\lvert\Gamma\rvert e^{j\theta}$ | $\lvert\Gamma\rvert e^{j(\theta+\pi)}$ | $\lvert\Gamma\rvert e^{j\theta}$ | $\lvert\Gamma\rvert e^{j\theta}$ |
| t+T | $\lvert\Gamma\rvert e^{-j(\theta+\pi)}$ | $\lvert\Gamma\rvert e^{j-(\theta+\pi)}$ | $\lvert\Gamma\rvert e^{-j\theta}$ | $\lvert\Gamma\rvert e^{j-(\theta+\pi)}$ |
| T+2T | $\lvert\Gamma\rvert e^{j\theta}$ | $\lvert\Gamma\rvert e^{j\theta}$ | $\lvert\Gamma\rvert e^{j\theta}$ | $\lvert\Gamma\rvert e^{j(\theta+\pi)}$ |
| T+3T | $\lvert\Gamma\rvert e^{-j\theta}$ | $\lvert\Gamma\rvert e^{j-(\theta+\pi)}$ | $\lvert\Gamma\rvert e^{-j(\theta+\pi)}$ | $\lvert\Gamma\rvert e^{j-(\theta+\pi)}$ |

| 0001 | Antenna1 | Antenna2 | Antenna3 | Antenna4 |
|---|---|---|---|---|
| t | $\lvert\Gamma\rvert e^{j\theta}$ | $\lvert\Gamma\rvert e^{j\theta}$ | $\lvert\Gamma\rvert e^{j\theta}$ | $\lvert\Gamma\rvert e^{j(\theta+\pi)}$ |
| t+T | $\lvert\Gamma\rvert e^{-j\theta}$ | $\lvert\Gamma\rvert e^{j-(\theta+\pi)}$ | $\lvert\Gamma\rvert e^{-j(\theta+\pi)}$ | $\lvert\Gamma\rvert e^{j-(\theta+\pi)}$ |
| T+2T | $\lvert\Gamma\rvert e^{j\theta}$ | $\lvert\Gamma\rvert e^{j(\theta+\pi)}$ | $\lvert\Gamma\rvert e^{j\theta}$ | $\lvert\Gamma\rvert e^{j\theta}$ |
| T+3T | $\lvert\Gamma\rvert e^{-j(\theta+\pi)}$ | $\lvert\Gamma\rvert e^{j-(\theta+\pi)}$ | $\lvert\Gamma\rvert e^{-j\theta}$ | $\lvert\Gamma\rvert e^{j-(\theta+\pi)}$ |
| 0101 | Antenna1 | Antenna2 | Antenna3 | Antenna4 |
| t | $\lvert\Gamma\rvert e^{j\theta}$ | $\lvert\Gamma\rvert e^{j(\theta+\pi)}$ | $\lvert\Gamma\rvert e^{j\theta}$ | $\lvert\Gamma\rvert e^{j(\theta+\pi)}$ |
| t+T | $\lvert\Gamma\rvert e^{-j(\theta+\pi)}$ | $\lvert\Gamma\rvert e^{j-(\theta+\pi)}$ | $\lvert\Gamma\rvert e^{-j(\theta+\pi)}$ | $\lvert\Gamma\rvert e^{j-(\theta+\pi)}$ |
| T+2T | $\lvert\Gamma\rvert e^{j\theta}$ | $\lvert\Gamma\rvert e^{j(\theta+\pi)}$ | $\lvert\Gamma\rvert e^{j\theta}$ | $\lvert\Gamma\rvert e^{j(\theta+\pi)}$ |
| T+3T | $\lvert\Gamma\rvert e^{-j(\theta+\pi)}$ | $\lvert\Gamma\rvert e^{j-(\theta+\pi)}$ | $\lvert\Gamma\rvert e^{-j(\theta+\pi)}$ | $\lvert\Gamma\rvert e^{j-(\theta+\pi)}$ |

FIG. 3A

| 0010 | Antenna1 | Antenna2 | Antenna3 | Antenna4 |
|---|---|---|---|---|
| t | $\lvert\Gamma\rvert e^{j\theta}$ | $\lvert\Gamma\rvert e^{j\theta}$ | $\lvert\Gamma\rvert e^{j(\theta+\pi)}$ | $\lvert\Gamma\rvert e^{j\theta}$ |
| t+T | $\lvert\Gamma\rvert e^{-j\theta}$ | $\lvert\Gamma\rvert e^{j-(\theta+\pi)}$ | $\lvert\Gamma\rvert e^{-j\theta}$ | $\lvert\Gamma\rvert e^{-j\theta}$ |
| T+2T | $\lvert\Gamma\rvert e^{j(\theta+\pi)}$ | $\lvert\Gamma\rvert e^{j\theta}$ | $\lvert\Gamma\rvert e^{j\theta}$ | $\lvert\Gamma\rvert e^{j\theta}$ |
| T+3T | $\lvert\Gamma\rvert e^{-j\theta}$ | $\lvert\Gamma\rvert e^{-j\theta}$ | $\lvert\Gamma\rvert e^{-j\theta}$ | $\lvert\Gamma\rvert e^{j-(\theta+\pi)}$ |
| 0110 | Antenna1 | Antenna2 | Antenna3 | Antenna4 |
| t | $\lvert\Gamma\rvert e^{j\theta}$ | $\lvert\Gamma\rvert e^{j(\theta+\pi)}$ | $\lvert\Gamma\rvert e^{j(\theta+\pi)}$ | $\lvert\Gamma\rvert e^{j\theta}$ |
| t+T | $\lvert\Gamma\rvert e^{-j(\theta+\pi)}$ | $\lvert\Gamma\rvert e^{j-(\theta+\pi)}$ | $\lvert\Gamma\rvert e^{-j\theta}$ | $\lvert\Gamma\rvert e^{-j\theta}$ |
| T+2T | $\lvert\Gamma\rvert e^{j(\theta+\pi)}$ | $\lvert\Gamma\rvert e^{j\theta}$ | $\lvert\Gamma\rvert e^{j\theta}$ | $\lvert\Gamma\rvert e^{j(\theta+\pi)}$ |
| T+3T | $\lvert\Gamma\rvert e^{-j\theta}$ | $\lvert\Gamma\rvert e^{-j\theta}$ | $\lvert\Gamma\rvert e^{-j(\theta+\pi)}$ | $\lvert\Gamma\rvert e^{j-(\theta+\pi)}$ |

| 0011 | Antenna1 | Antenna2 | Antenna3 | Antenna4 |
|---|---|---|---|---|
| t | $\lvert\Gamma\rvert e^{j\theta}$ | $\lvert\Gamma\rvert e^{j\theta}$ | $\lvert\Gamma\rvert e^{j(\theta+\pi)}$ | $\lvert\Gamma\rvert e^{j(\theta+\pi)}$ |
| t+T | $\lvert\Gamma\rvert e^{-j\theta}$ | $\lvert\Gamma\rvert e^{j-(\theta+\pi)}$ | $\lvert\Gamma\rvert e^{-j(\theta+\pi)}$ | $\lvert\Gamma\rvert e^{-j\theta}$ |
| T+2T | $\lvert\Gamma\rvert e^{j(\theta+\pi)}$ | $\lvert\Gamma\rvert e^{j(\theta+\pi)}$ | $\lvert\Gamma\rvert e^{j\theta}$ | $\lvert\Gamma\rvert e^{j\theta}$ |
| T+3T | $\lvert\Gamma\rvert e^{-j(\theta+\pi)}$ | $\lvert\Gamma\rvert e^{-j\theta}$ | $\lvert\Gamma\rvert e^{-j\theta}$ | $\lvert\Gamma\rvert e^{j-(\theta+\pi)}$ |
| 0111 | Antenna1 | Antenna2 | Antenna3 | Antenna4 |
| t | $\lvert\Gamma\rvert e^{j\theta}$ | $\lvert\Gamma\rvert e^{j(\theta+\pi)}$ | $\lvert\Gamma\rvert e^{j(\theta+\pi)}$ | $\lvert\Gamma\rvert e^{j(\theta+\pi)}$ |
| t+T | $\lvert\Gamma\rvert e^{-j(\theta+\pi)}$ | $\lvert\Gamma\rvert e^{-j(\theta+\pi)}$ | $\lvert\Gamma\rvert e^{-j(\theta+\pi)}$ | $\lvert\Gamma\rvert e^{-j\theta}$ |
| T+2T | $\lvert\Gamma\rvert e^{j(\theta+\pi)}$ | $\lvert\Gamma\rvert e^{j(\theta+\pi)}$ | $\lvert\Gamma\rvert e^{j\theta}$ | $\lvert\Gamma\rvert e^{j(\theta+\pi)}$ |
| T+3T | $\lvert\Gamma\rvert e^{-j(\theta+\pi)}$ | $\lvert\Gamma\rvert e^{-j\theta}$ | $\lvert\Gamma\rvert e^{-j(\theta+\pi)}$ | $\lvert\Gamma\rvert e^{-j(\theta+\pi)}$ |

FIG. 3B

| 1000 | Antenna1 | Antenna2 | Antenna3 | Antenna4 |
|---|---|---|---|---|
| t | $\lvert\Gamma\rvert e^{j(\theta+\pi)}$ | $\lvert\Gamma\rvert e^{j\theta}$ | $\lvert\Gamma\rvert e^{j\theta}$ | $\lvert\Gamma\rvert e^{j\theta}$ |
| t+T | $\lvert\Gamma\rvert e^{-j\theta}$ | $\lvert\Gamma\rvert e^{-j\theta}$ | $\lvert\Gamma\rvert e^{-j\theta}$ | $\lvert\Gamma\rvert e^{j-(\theta+\pi)}$ |
| T+2T | $\lvert\Gamma\rvert e^{j\theta}$ | $\lvert\Gamma\rvert e^{j\theta}$ | $\lvert\Gamma\rvert e^{j(\theta+\pi)}$ | $\lvert\Gamma\rvert e^{j\theta}$ |
| T+3T | $\lvert\Gamma\rvert e^{-j\theta}$ | $\lvert\Gamma\rvert e^{j-(\theta+\pi)}$ | $\lvert\Gamma\rvert e^{-j\theta}$ | $\lvert\Gamma\rvert e^{-j\theta}$ |

| 1100 | Antenna1 | Antenna2 | Antenna3 | Antenna4 |
|---|---|---|---|---|
| t | $\lvert\Gamma\rvert e^{j(\theta+\pi)}$ | $\lvert\Gamma\rvert e^{j(\theta+\pi)}$ | $\lvert\Gamma\rvert e^{j\theta}$ | $\lvert\Gamma\rvert e^{j\theta}$ |
| t+T | $\lvert\Gamma\rvert e^{-j(\theta+\pi)}$ | $\lvert\Gamma\rvert e^{-j\theta}$ | $\lvert\Gamma\rvert e^{-j\theta}$ | $\lvert\Gamma\rvert e^{-j(\theta+\pi)}$ |
| T+2T | $\lvert\Gamma\rvert e^{j\theta}$ | $\lvert\Gamma\rvert e^{j\theta}$ | $\lvert\Gamma\rvert e^{j(\theta+\pi)}$ | $\lvert\Gamma\rvert e^{j(\theta+\pi)}$ |
| T+3T | $\lvert\Gamma\rvert e^{-j\theta}$ | $\lvert\Gamma\rvert e^{-j(\theta+\pi)}$ | $\lvert\Gamma\rvert e^{-j(\theta+\pi)}$ | $\lvert\Gamma\rvert e^{-j\theta}$ |

| 1001 | Antenna1 | Antenna2 | Antenna3 | Antenna4 |
|---|---|---|---|---|
| t | $\lvert\Gamma\rvert e^{j(\theta+\pi)}$ | $\lvert\Gamma\rvert e^{j\theta}$ | $\lvert\Gamma\rvert e^{j\theta}$ | $\lvert\Gamma\rvert e^{j(\theta+\pi)}$ |
| t+T | $\lvert\Gamma\rvert e^{-j\theta}$ | $\lvert\Gamma\rvert e^{-j\theta}$ | $\lvert\Gamma\rvert e^{-j(\theta+\pi)}$ | $\lvert\Gamma\rvert e^{j-(\theta+\pi)}$ |
| T+2T | $\lvert\Gamma\rvert e^{j\theta}$ | $\lvert\Gamma\rvert e^{j(\theta+\pi)}$ | $\lvert\Gamma\rvert e^{j(\theta+\pi)}$ | $\lvert\Gamma\rvert e^{j\theta}$ |
| T+3T | $\lvert\Gamma\rvert e^{-j(\theta+\pi)}$ | $\lvert\Gamma\rvert e^{j-(\theta+\pi)}$ | $\lvert\Gamma\rvert e^{-j\theta}$ | $\lvert\Gamma\rvert e^{-j\theta}$ |

| 1101 | Antenna1 | Antenna2 | Antenna3 | Antenna4 |
|---|---|---|---|---|
| t | $\lvert\Gamma\rvert e^{j(\theta+\pi)}$ | $\lvert\Gamma\rvert e^{j(\theta+\pi)}$ | $\lvert\Gamma\rvert e^{j\theta}$ | $\lvert\Gamma\rvert e^{j(\theta+\pi)}$ |
| t+T | $\lvert\Gamma\rvert e^{-j(\theta+\pi)}$ | $\lvert\Gamma\rvert e^{-j\theta}$ | $\lvert\Gamma\rvert e^{-j(\theta+\pi)}$ | $\lvert\Gamma\rvert e^{-j(\theta+\pi)}$ |
| T+2T | $\lvert\Gamma\rvert e^{j\theta}$ | $\lvert\Gamma\rvert e^{j(\theta+\pi)}$ | $\lvert\Gamma\rvert e^{j(\theta+\pi)}$ | $\lvert\Gamma\rvert e^{j(\theta+\pi)}$ |
| T+3T | $\lvert\Gamma\rvert e^{-j(\theta+\pi)}$ | $\lvert\Gamma\rvert e^{-j(\theta+\pi)}$ | $\lvert\Gamma\rvert e^{-j(\theta+\pi)}$ | $\lvert\Gamma\rvert e^{-j\theta}$ |

FIG. 3C

| 1010 | Antenna1 | Antenna2 | Antenna3 | Antenna4 |
|---|---|---|---|---|
| t | $|\Gamma|e^{j(\theta+\pi)}$ | $|\Gamma|e^{j\theta}$ | $|\Gamma|e^{j(\theta+\pi)}$ | $|\Gamma|e^{j\theta}$ |
| t+T | $|\Gamma|e^{-j\theta}$ | $|\Gamma|e^{-j\theta}$ | $|\Gamma|e^{-j\theta}$ | $|\Gamma|e^{-j\theta}$ |
| T+2T | $|\Gamma|e^{j(\theta+\pi)}$ | $|\Gamma|e^{j\theta}$ | $|\Gamma|e^{j(\theta+\pi)}$ | $|\Gamma|e^{j\theta}$ |
| T+3T | $|\Gamma|e^{-j\theta}$ | $|\Gamma|e^{-j\theta}$ | $|\Gamma|e^{-j\theta}$ | $|\Gamma|e^{-j\theta}$ |
| 1110 | Antenna1 | Antenna2 | Antenna3 | Antenna4 |
| t | $|\Gamma|e^{j(\theta+\pi)}$ | $|\Gamma|e^{j(\theta+\pi)}$ | $|\Gamma|e^{j(\theta+\pi)}$ | $|\Gamma|e^{j\theta}$ |
| t+T | $|\Gamma|e^{-j(\theta+\pi)}$ | $|\Gamma|e^{-j\theta}$ | $|\Gamma|e^{-j\theta}$ | $|\Gamma|e^{-j\theta}$ |
| T+2T | $|\Gamma|e^{j(\theta+\pi)}$ | $|\Gamma|e^{j\theta}$ | $|\Gamma|e^{j(\theta+\pi)}$ | $|\Gamma|e^{j(\theta+\pi)}$ |
| T+3T | $|\Gamma|e^{-j\theta}$ | $|\Gamma|e^{-j\theta}$ | $|\Gamma|e^{-j(\theta+\pi)}$ | $|\Gamma|e^{-j\theta}$ |

| 1011 | Antenna1 | Antenna2 | Antenna3 | Antenna4 |
|---|---|---|---|---|
| T | $|\Gamma|e^{j(\theta+\pi)}$ | $|\Gamma|e^{j\theta}$ | $|\Gamma|e^{j(\theta+\pi)}$ | $|\Gamma|e^{j(\theta+\pi)}$ |
| t+T | $|\Gamma|e^{-j\theta}$ | $|\Gamma|e^{-j\theta}$ | $|\Gamma|e^{-j(\theta+\pi)}$ | $|\Gamma|e^{-j\theta}$ |
| T+2T | $|\Gamma|e^{j(\theta+\pi)}$ | $|\Gamma|e^{j(\theta+\pi)}$ | $|\Gamma|e^{j(\theta+\pi)}$ | $|\Gamma|e^{j\theta}$ |
| T+3T | $|\Gamma|e^{-j(\theta+\pi)}$ | $|\Gamma|e^{-j\theta}$ | $|\Gamma|e^{-j\theta}$ | $|\Gamma|e^{-j\theta}$ |
| 1111 | Antenna1 | Antenna2 | Antenna3 | Antenna4 |
| t | $|\Gamma|e^{j(\theta+\pi)}$ | $|\Gamma|e^{j(\theta+\pi)}$ | $|\Gamma|e^{j(\theta+\pi)}$ | $|\Gamma|e^{j(\theta+\pi)}$ |
| t+T | $|\Gamma|e^{-j(\theta+\pi)}$ | $|\Gamma|e^{-j\theta}$ | $|\Gamma|e^{-j(\theta+\pi)}$ | $|\Gamma|e^{-j\theta}$ |
| T+2T | $|\Gamma|e^{j(\theta+\pi)}$ | $|\Gamma|e^{j(\theta+\pi)}$ | $|\Gamma|e^{j(\theta+\pi)}$ | $|\Gamma|e^{j(\theta+\pi)}$ |
| T+3T | $|\Gamma|e^{-j(\theta+\pi)}$ | $|\Gamma|e^{-j\theta}$ | $|\Gamma|e^{-j(\theta+\pi)}$ | $|\Gamma|e^{-j\theta}$ |

FIG. 3D

| 0000 | Antenna1 | Antenna2 | Antenna3 | Antenna4 |
|---|---|---|---|---|
| t | $|\Gamma|e^{j\theta}$ | $|\Gamma|e^{-j\theta}$ | $|\Gamma|e^{-j\theta}$ | $|\Gamma|e^{j\theta}$ |
| t+T | $|\Gamma|e^{j\theta}$ | $|\Gamma|e^{-j(\theta+\pi)}$ | $|\Gamma|e^{-j\theta}$ | $|\Gamma|e^{j(\theta+\pi)}$ |
| T+2T | $|\Gamma|e^{j\theta}$ | $|\Gamma|e^{-j\theta}$ | $|\Gamma|e^{-j(\theta+\pi)}$ | $|\Gamma|e^{j(\theta+\pi)}$ |
| T+3T | $|\Gamma|e^{j\theta}$ | $|\Gamma|e^{-j(\theta+\pi)}$ | $|\Gamma|e^{-j(\theta+\pi)}$ | $|\Gamma|e^{j\theta}$ |

| 0100 | Antenna1 | Antenna2 | Antenna3 | Antenna4 |
|---|---|---|---|---|
| t | $|\Gamma|e^{j\theta}$ | $|\Gamma|e^{-j(\theta+\pi)}$ | $|\Gamma|e^{-j\theta}$ | $|\Gamma|e^{j\theta}$ |
| t+T | $|\Gamma|e^{j(\theta+\pi)}$ | $|\Gamma|e^{-j(\theta+\pi)}$ | $|\Gamma|e^{-j\theta}$ | $|\Gamma|e^{j(\theta+\pi)}$ |
| T+2T | $|\Gamma|e^{j\theta}$ | $|\Gamma|e^{-j\theta}$ | $|\Gamma|e^{-j(\theta+\pi)}$ | $|\Gamma|e^{j\theta}$ |
| T+3T | $|\Gamma|e^{j\theta}$ | $|\Gamma|e^{-j(\theta+\pi)}$ | $|\Gamma|e^{-j\theta}$ | $|\Gamma|e^{j\theta}$ |

| 0001 | Antenna1 | Antenna2 | Antenna3 | Antenna4 |
|---|---|---|---|---|
| t | $|\Gamma|e^{j\theta}$ | $|\Gamma|e^{-j\theta}$ | $|\Gamma|e^{-j\theta}$ | $|\Gamma|e^{j(\theta+\pi)}$ |
| t+T | $|\Gamma|e^{j\theta}$ | $|\Gamma|e^{-j(\theta+\pi)}$ | $|\Gamma|e^{-j(\theta+\pi)}$ | $|\Gamma|e^{j(\theta+\pi)}$ |
| T+2T | $|\Gamma|e^{j\theta}$ | $|\Gamma|e^{-j(\theta+\pi)}$ | $|\Gamma|e^{-j(\theta+\pi)}$ | $|\Gamma|e^{j(\theta+\pi)}$ |
| T+3T | $|\Gamma|e^{j(\theta+\pi)}$ | $|\Gamma|e^{-j(\theta+\pi)}$ | $|\Gamma|e^{-j(\theta+\pi)}$ | $|\Gamma|e^{j\theta}$ |

| 0101 | Antenna1 | Antenna2 | Antenna3 | Antenna4 |
|---|---|---|---|---|
| t | $|\Gamma|e^{j\theta}$ | $|\Gamma|e^{-j(\theta+\pi)}$ | $|\Gamma|e^{-j\theta}$ | $|\Gamma|e^{j(\theta+\pi)}$ |
| t+T | $|\Gamma|e^{j(\theta+\pi)}$ | $|\Gamma|e^{-j(\theta+\pi)}$ | $|\Gamma|e^{-j(\theta+\pi)}$ | $|\Gamma|e^{j(\theta+\pi)}$ |
| T+2T | $|\Gamma|e^{j\theta}$ | $|\Gamma|e^{-j(\theta+\pi)}$ | $|\Gamma|e^{-j(\theta+\pi)}$ | $|\Gamma|e^{j\theta}$ |
| T+3T | $|\Gamma|e^{j(\theta+\pi)}$ | $|\Gamma|e^{-j(\theta+\pi)}$ | $|\Gamma|e^{-j\theta}$ | $|\Gamma|e^{j\theta}$ |

FIG. 4A

| 0010 | Antenna1 | Antenna2 | Antenna3 | Antenna4 | 0011 | Antenna1 | Antenna2 | Antenna3 | Antenna4 |
|---|---|---|---|---|---|---|---|---|---|
| t | $\|\Gamma\|e^{j\theta}$ | $\|\Gamma\|e^{-j\theta}$ | $\|\Gamma\|e^{-j(\theta+\pi)}$ | $\|\Gamma\|e^{j\theta}$ | t | $\|\Gamma\|e^{j\theta}$ | $\|\Gamma\|e^{-j\theta}$ | $\|\Gamma\|e^{-j(\theta+\pi)}$ | $\|\Gamma\|e^{j(\theta+\pi)}$ |
| t+T | $\|\Gamma\|e^{j\theta}$ | $\|\Gamma\|e^{-j(\theta+\pi)}$ | $\|\Gamma\|e^{-j\theta}$ | $\|\Gamma\|e^{j\theta}$ | t+T | $\|\Gamma\|e^{j\theta}$ | $\|\Gamma\|e^{-j(\theta+\pi)}$ | $\|\Gamma\|e^{-j(\theta+\pi)}$ | $\|\Gamma\|e^{j\theta}$ |
| T+2T | $\|\Gamma\|e^{j(\theta+\pi)}$ | $\|\Gamma\|e^{-j\theta}$ | $\|\Gamma\|e^{-j(\theta+\pi)}$ | $\|\Gamma\|e^{j(\theta+\pi)}$ | T+2T | $\|\Gamma\|e^{j(\theta+\pi)}$ | $\|\Gamma\|e^{-j(\theta+\pi)}$ | $\|\Gamma\|e^{-j(\theta+\pi)}$ | $\|\Gamma\|e^{j(\theta+\pi)}$ |
| T+3T | $\|\Gamma\|e^{j\theta}$ | $\|\Gamma\|e^{-j\theta}$ | $\|\Gamma\|e^{-j(\theta+\pi)}$ | $\|\Gamma\|e^{j\theta}$ | T+3T | $\|\Gamma\|e^{j(\theta+\pi)}$ | $\|\Gamma\|e^{-j\theta}$ | $\|\Gamma\|e^{-j(\theta+\pi)}$ | $\|\Gamma\|e^{j\theta}$ |
| 0110 | Antenna1 | Antenna2 | Antenna3 | Antenna4 | 0111 | Antenna1 | Antenna2 | Antenna3 | Antenna4 |
| t | $\|\Gamma\|e^{j\theta}$ | $\|\Gamma\|e^{-j(\theta+\pi)}$ | $\|\Gamma\|e^{j\theta}$ | $\|\Gamma\|e^{j\theta}$ | t | $\|\Gamma\|e^{j\theta}$ | $\|\Gamma\|e^{-j(\theta+\pi)}$ | $\|\Gamma\|e^{-j(\theta+\pi)}$ | $\|\Gamma\|e^{j(\theta+\pi)}$ |
| t+T | $\|\Gamma\|e^{j(\theta+\pi)}$ | $\|\Gamma\|e^{-j(\theta+\pi)}$ | $\|\Gamma\|e^{-j\theta}$ | $\|\Gamma\|e^{j\theta}$ | t+T | $\|\Gamma\|e^{j(\theta+\pi)}$ | $\|\Gamma\|e^{-j(\theta+\pi)}$ | $\|\Gamma\|e^{-j(\theta+\pi)}$ | $\|\Gamma\|e^{j\theta}$ |
| T+2T | $\|\Gamma\|e^{j(\theta+\pi)}$ | $\|\Gamma\|e^{-j\theta}$ | $\|\Gamma\|e^{-j(\theta+\pi)}$ | $\|\Gamma\|e^{j\theta}$ | T+2T | $\|\Gamma\|e^{j(\theta+\pi)}$ | $\|\Gamma\|e^{-j(\theta+\pi)}$ | $\|\Gamma\|e^{-j(\theta+\pi)}$ | $\|\Gamma\|e^{j\theta}$ |
| T+3T | $\|\Gamma\|e^{j\theta}$ | $\|\Gamma\|e^{-j\theta}$ | $\|\Gamma\|e^{-j\theta}$ | $\|\Gamma\|e^{j\theta}$ | T+3T | $\|\Gamma\|e^{j(\theta+\pi)}$ | $\|\Gamma\|e^{-j\theta}$ | $\|\Gamma\|e^{-j\theta}$ | $\|\Gamma\|e^{j\theta}$ |

FIG. 4B

| 1000 | Antenna1 | Antenna2 | Antenna3 | Antenna4 |
|------|----------|----------|----------|----------|
| t | $|\Gamma|e^{j(\theta+\pi)}$ | $|\Gamma|e^{-j\theta}$ | $|\Gamma|e^{-j\theta}$ | $|\Gamma|e^{j\theta}$ |
| t+T | $|\Gamma|e^{j\theta}$ | $|\Gamma|e^{-j\theta}$ | $|\Gamma|e^{-j\theta}$ | $|\Gamma|e^{j(\theta+\pi)}$ |
| T+2T | $|\Gamma|e^{j\theta}$ | $|\Gamma|e^{-j\theta}$ | $|\Gamma|e^{-j\theta}$ | $|\Gamma|e^{j(\theta+\pi)}$ |
| T+3T | $|\Gamma|e^{j\theta}$ | $|\Gamma|e^{-j(\theta+\pi)}$ | $|\Gamma|e^{-j(\theta+\pi)}$ | $|\Gamma|e^{j(\theta+\pi)}$ |
| 1100 | Antenna1 | Antenna2 | Antenna3 | Antenna4 |
| t | $|\Gamma|e^{j(\theta+\pi)}$ | $|\Gamma|e^{-j(\theta+\pi)}$ | $|\Gamma|e^{-j\theta}$ | $|\Gamma|e^{j\theta}$ |
| t+T | $|\Gamma|e^{j(\theta+\pi)}$ | $|\Gamma|e^{-j\theta}$ | $|\Gamma|e^{-j\theta}$ | $|\Gamma|e^{j(\theta+\pi)}$ |
| T+2T | $|\Gamma|e^{j\theta}$ | $|\Gamma|e^{-j\theta}$ | $|\Gamma|e^{-j\theta}$ | $|\Gamma|e^{j\theta}$ |
| T+3T | $|\Gamma|e^{j\theta}$ | $|\Gamma|e^{-j(\theta+\pi)}$ | $|\Gamma|e^{-j(\theta+\pi)}$ | $|\Gamma|e^{j(\theta+\pi)}$ |

| 1001 | Antenna1 | Antenna2 | Antenna3 | Antenna4 |
|------|----------|----------|----------|----------|
| t | $|\Gamma|e^{j(\theta+\pi)}$ | $|\Gamma|e^{-j\theta}$ | $|\Gamma|e^{-j\theta}$ | $|\Gamma|e^{j(\theta+\pi)}$ |
| t+T | $|\Gamma|e^{j\theta}$ | $|\Gamma|e^{-j\theta}$ | $|\Gamma|e^{-j(\theta+\pi)}$ | $|\Gamma|e^{j(\theta+\pi)}$ |
| T+2T | $|\Gamma|e^{j\theta}$ | $|\Gamma|e^{-j(\theta+\pi)}$ | $|\Gamma|e^{-j\theta}$ | $|\Gamma|e^{j(\theta+\pi)}$ |
| T+3T | $|\Gamma|e^{j(\theta+\pi)}$ | $|\Gamma|e^{-j(\theta+\pi)}$ | $|\Gamma|e^{-j(\theta+\pi)}$ | $|\Gamma|e^{j(\theta+\pi)}$ |
| 1101 | Antenna1 | Antenna2 | Antenna3 | Antenna4 |
| t | $|\Gamma|e^{j(\theta+\pi)}$ | $|\Gamma|e^{-j(\theta+\pi)}$ | $|\Gamma|e^{-j\theta}$ | $|\Gamma|e^{j(\theta+\pi)}$ |
| t+T | $|\Gamma|e^{j(\theta+\pi)}$ | $|\Gamma|e^{-j\theta}$ | $|\Gamma|e^{-j(\theta+\pi)}$ | $|\Gamma|e^{j(\theta+\pi)}$ |
| T+2T | $|\Gamma|e^{j\theta}$ | $|\Gamma|e^{-j(\theta+\pi)}$ | $|\Gamma|e^{-j\theta}$ | $|\Gamma|e^{j\theta}$ |
| T+3T | $|\Gamma|e^{j(\theta+\pi)}$ | $|\Gamma|e^{-j(\theta+\pi)}$ | $|\Gamma|e^{-j(\theta+\pi)}$ | $|\Gamma|e^{j(\theta+\pi)}$ |

FIG. 4C

| 1010 | Antenna1 | Antenna2 | Antenna3 | Antenna4 |
| --- | --- | --- | --- | --- |
| t | $\lvert\Gamma\rvert e^{j(\theta+\pi)}$ | $\lvert\Gamma\rvert e^{-j\theta}$ | $\lvert\Gamma\rvert e^{-j(\theta+\pi)}$ | $\lvert\Gamma\rvert e^{j\theta}$ |
| t+T | $\lvert\Gamma\rvert e^{j\theta}$ | $\lvert\Gamma\rvert e^{-j\theta}$ | $\lvert\Gamma\rvert e^{-j\theta}$ | $\lvert\Gamma\rvert e^{j\theta}$ |
| T+2T | $\lvert\Gamma\rvert e^{j(\theta+\pi)}$ | $\lvert\Gamma\rvert e^{-j\theta}$ | $\lvert\Gamma\rvert e^{-j\theta}$ | $\lvert\Gamma\rvert e^{j(\theta+\pi)}$ |
| T+3T | $\lvert\Gamma\rvert e^{j\theta}$ | $\lvert\Gamma\rvert e^{-j\theta}$ | $\lvert\Gamma\rvert e^{-j(\theta+\pi)}$ | $\lvert\Gamma\rvert e^{j(\theta+\pi)}$ |
| 1110 | Antenna1 | Antenna2 | Antenna3 | Antenna4 |
| t | $\lvert\Gamma\rvert e^{j(\theta+\pi)}$ | $\lvert\Gamma\rvert e^{-j(\theta+\pi)}$ | $\lvert\Gamma\rvert e^{-j(\theta+\pi)}$ | $\lvert\Gamma\rvert e^{j\theta}$ |
| t+T | $\lvert\Gamma\rvert e^{j(\theta+\pi)}$ | $\lvert\Gamma\rvert e^{-j\theta}$ | $\lvert\Gamma\rvert e^{-j\theta}$ | $\lvert\Gamma\rvert e^{j\theta}$ |
| T+2T | $\lvert\Gamma\rvert e^{j(\theta+\pi)}$ | $\lvert\Gamma\rvert e^{-j\theta}$ | $\lvert\Gamma\rvert e^{-j\theta}$ | $\lvert\Gamma\rvert e^{j\theta}$ |
| T+3T | $\lvert\Gamma\rvert e^{j\theta}$ | $\lvert\Gamma\rvert e^{-j\theta}$ | $\lvert\Gamma\rvert e^{-j\theta}$ | $\lvert\Gamma\rvert e^{j(\theta+\pi)}$ |

| 1011 | Antenna1 | Antenna2 | Antenna3 | Antenna4 |
| --- | --- | --- | --- | --- |
| T | $\lvert\Gamma\rvert e^{j(\theta+\pi)}$ | $\lvert\Gamma\rvert e^{-j\theta}$ | $\lvert\Gamma\rvert e^{-j(\theta+\pi)}$ | $\lvert\Gamma\rvert e^{j(\theta+\pi)}$ |
| t+T | $\lvert\Gamma\rvert e^{j\theta}$ | $\lvert\Gamma\rvert e^{-j\theta}$ | $\lvert\Gamma\rvert e^{-j(\theta+\pi)}$ | $\lvert\Gamma\rvert e^{j\theta}$ |
| T+2T | $\lvert\Gamma\rvert e^{j(\theta+\pi)}$ | $\lvert\Gamma\rvert e^{-j(\theta+\pi)}$ | $\lvert\Gamma\rvert e^{-j\theta}$ | $\lvert\Gamma\rvert e^{j(\theta+\pi)}$ |
| T+3T | $\lvert\Gamma\rvert e^{j(\theta+\pi)}$ | $\lvert\Gamma\rvert e^{-j\theta}$ | $\lvert\Gamma\rvert e^{-j(\theta+\pi)}$ | $\lvert\Gamma\rvert e^{j(\theta+\pi)}$ |
| 1111 | Antenna1 | Antenna2 | Antenna3 | Antenna4 |
| t | $\lvert\Gamma\rvert e^{j(\theta+\pi)}$ | $\lvert\Gamma\rvert e^{-j(\theta+\pi)}$ | $\lvert\Gamma\rvert e^{-j(\theta+\pi)}$ | $\lvert\Gamma\rvert e^{j(\theta+\pi)}$ |
| t+T | $\lvert\Gamma\rvert e^{j(\theta+\pi)}$ | $\lvert\Gamma\rvert e^{-j\theta}$ | $\lvert\Gamma\rvert e^{-j(\theta+\pi)}$ | $\lvert\Gamma\rvert e^{j\theta}$ |
| T+2T | $\lvert\Gamma\rvert e^{j(\theta+\pi)}$ | $\lvert\Gamma\rvert e^{-j(\theta+\pi)}$ | $\lvert\Gamma\rvert e^{-j\theta}$ | $\lvert\Gamma\rvert e^{j\theta}$ |
| T+3T | $\lvert\Gamma\rvert e^{j(\theta+\pi)}$ | $\lvert\Gamma\rvert e^{-j\theta}$ | $\lvert\Gamma\rvert e^{-j(\theta+\pi)}$ | $\lvert\Gamma\rvert e^{j(\theta+\pi)}$ |

FIG. 4D

Figure 5:
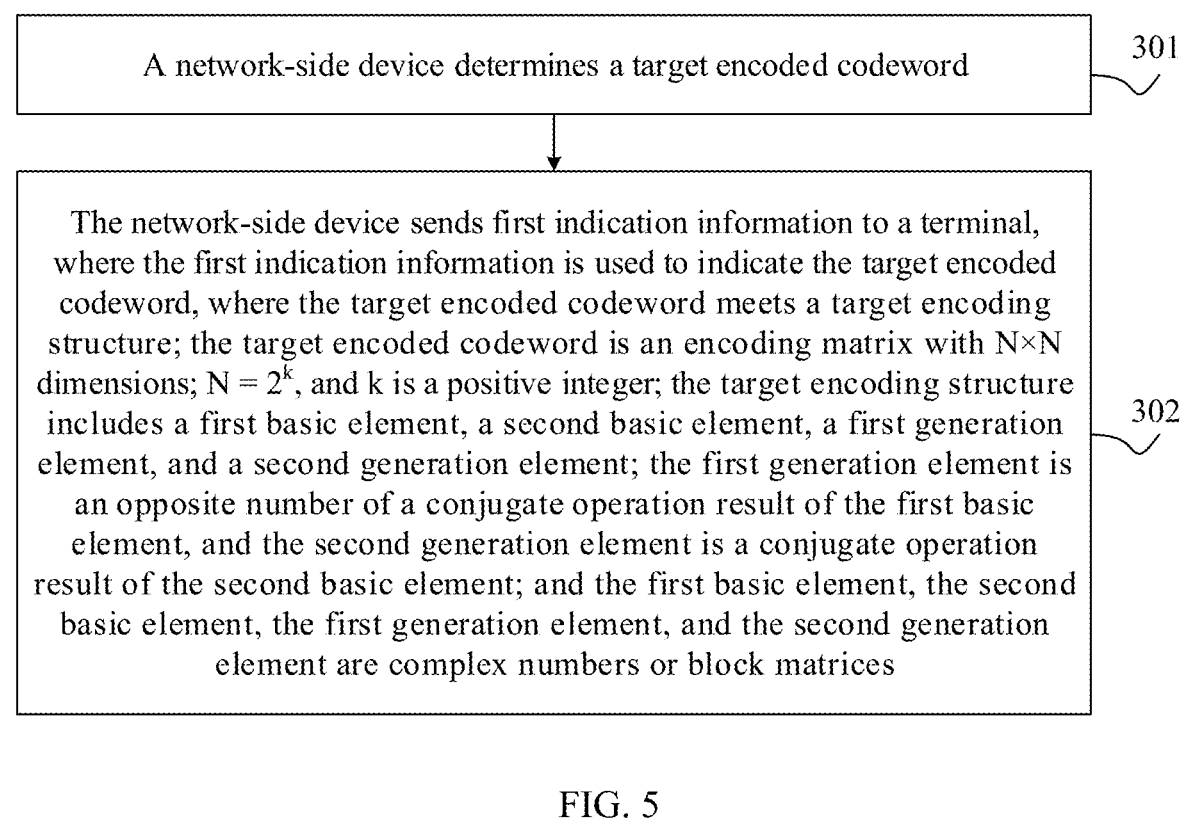

A network-side device determines a target encoded codeword | 301

The network-side device sends first indication information to a terminal, where the first indication information is used to indicate the target encoded codeword, where the target encoded codeword meets a target encoding structure; the target encoded codeword is an encoding matrix with N×N dimensions; N = $2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices | 302

DIVERSITY TRANSMISSION METHOD, TERMINAL, AND NETWORK-SIDE DEVICE

CROSS-REFERENCE TO RELATED APPLICATIONS

This application is a continuation of International Application No. PCT/CN2022/136286, filed on Dec. 2, 2022, which claims priority to Chinese Patent Application No. 202111484934.3, filed Dec. 7, 2021. The entire contents of each of the above-identified applications are expressly incorporated herein by reference.

TECHNICAL FIELD

This application is directed to the field of communications technologies, and specifically relates to a diversity transmission method, a terminal, and a network-side device.

BACKGROUND

With development of mobile communications technologies, a communications network needs to support the massive Internet of Things (Internet of Things, IoT). Massive IoT devices pose new challenges in terms of costs and power consumption. Therefore, a main trend in development of Internet of Things devices includes cellular networking, low costs, low power consumption, and even passive zero power consumption. However, conventional passive terminals are limited by their power consumption and hardware capabilities, and communication transmission distances of most of the terminals are less than 10 meters, far from a goal of cellular coverage of 100 meters. In consideration of this, a backscatter communications technology may be used to effectively increase communication distances of the Internet of Things devices. Backscatter communication means that backscatter communication user equipment uses a radio frequency signal from another device or in an environment to perform signal modulation to transmit information of the backscatter communication user equipment.

In the related art, signal redundancy is introduced in space domain and time domain by using a Space Time Block Code (STBC), and a diversity gain and an antenna gain are achieved by properly constructing a block code transmission matrix without increasing a bandwidth. Although an Orthogonal Space Time Block Code (OSTBC) codebook can achieve a full rate while achieving a full diversity gain, this type of codebook is applicable only to a two-antenna transmit diversity scenario. A Quasi-orthogonal Space Time Block Code (QSTBC) codebook may be extended to a transmit diversity scenario with more than two antennas, and achieve a full rate while achieving a diversity gain slightly worse than a full diversity gain.

Actually, because backscatter communication controls an amplitude or a phase of a signal by changing a load impedance, considering other non-ideal factors in a modulation circuit for backscatter communication, there are more or less errors in an amplitude or a phase of an output signal. However, OSTBC and QSTBC diversity schemes are both designed for conventional active radio frequency communication and do not consider modulation characteristics of passive terminals such as backscatter communication. When the OSTBC and QSTBC diversity schemes are applied in backscatter communications, there are problems of high system implementation complexity and a high probability of error detection.

SUMMARY

Embodiments of this application provide a diversity transmission method, a terminal, and a network-side device.

According to a first aspect, a diversity transmission method is provided. The method is applied to a terminal and includes:

determining, by the terminal, a target encoded codeword; and performing, by the terminal, diversity transmission based on the target encoded codeword, where the target encoded codeword meets a target encoding structure; the target encoded codeword is an encoding matrix with N×N dimensions; $N=2^k$, and k is a positive integer;

the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

According to a second aspect, a diversity transmission method is provided. The method is applied to a network-side device and includes:

determining, by the network-side device, a target encoded codeword; and sending, by the network-side device, first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

According to a third aspect, a diversity transmission apparatus is provided. The apparatus is applied to a terminal and includes:

a first determining module, configured to determine a target encoded codeword; and a transmission module, configured to perform diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element, and the second generation element are complex numbers or block matrices.

According to a fourth aspect, a diversity transmission apparatus is provided. The apparatus is applied to a network-side device and includes:

a second determining module, configured to determine a target encoded codeword; and a first sending module, configured to send first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

According to a fifth aspect, a terminal is provided. The terminal includes a processor and a memory. The memory stores a program or instructions capable of running on the processor. When the program or instructions are executed by the processor, the steps of the method according to the first aspect are implemented.

According to a sixth aspect, a terminal is provided and includes a processor and a communication interface. The processor is configured to determine a target encoded codeword; and the communication interface is configured to perform diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

According to a seventh aspect, a network-side device is provided. The network-side device includes a processor and a memory. The memory stores a program or instructions capable of running on the processor. When the program or instructions are executed by the processor, the steps of the method according to the second aspect are implemented.

According to an eighth aspect, a network-side device is provided and includes a processor and a communication interface. The processor is configured to determine a target encoded codeword; and the communication interface is configured to send first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer;

the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

According to a ninth aspect, a diversity transmission system is provided and includes a terminal and a network-side device. The terminal may be configured to perform the steps of the diversity transmission method according to the first aspect. The network-side device may be configured to perform the steps of the diversity transmission method according to the second aspect.

According to a tenth aspect, a readable storage medium is provided. The readable storage medium stores a program or instructions. When the program or instructions are executed by a processor, the steps of the method according to the first aspect are implemented, or the steps of the method according to the second aspect are implemented.

According to an eleventh aspect, a chip is provided. The chip includes a processor and a communication interface. The communication interface is coupled to the processor. The processor is configured to run a program or instructions to implement the method according to the first aspect or implement the method according to the second aspect.

According to a twelfth aspect, a computer program or program product is provided. The computer program or program product is stored in a storage medium. The computer program or program product is executed by at least one processor to implement the steps of the method according to the first aspect or implement the steps of the method according to the second aspect.

In the embodiments of this application, the terminal determines the target encoded codeword meeting the target encoding structure and performs multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in the embodiments of this application can not only ensure a diversity gain, but also reduce types of reflection coefficients required on each antenna, that is, reduce types of load impedances required on each antenna, thereby reducing system implementation complexity and effectively reducing a probability of error detection.

BRIEF DESCRIPTION OF DRAWINGS

FIG. 1 is a schematic diagram of a wireless communications system to which an embodiment of this application can be applied;

FIG. 2 is a first flowchart of a diversity transmission method according to an embodiment of this application;

FIGS. 3A-3D are four Four-antenna transmit diversity encoding tables of the diversity encoded codeword according to an embodiment of this application;

FIGS. 4A-4D are four Four-antenna transmit diversity encoding tables of the ABBA QSTBC in the related art;

FIG. 5 is a second flowchart of a diversity transmission method according to an embodiment of this application;

DETAILED DESCRIPTION

Figure 6:
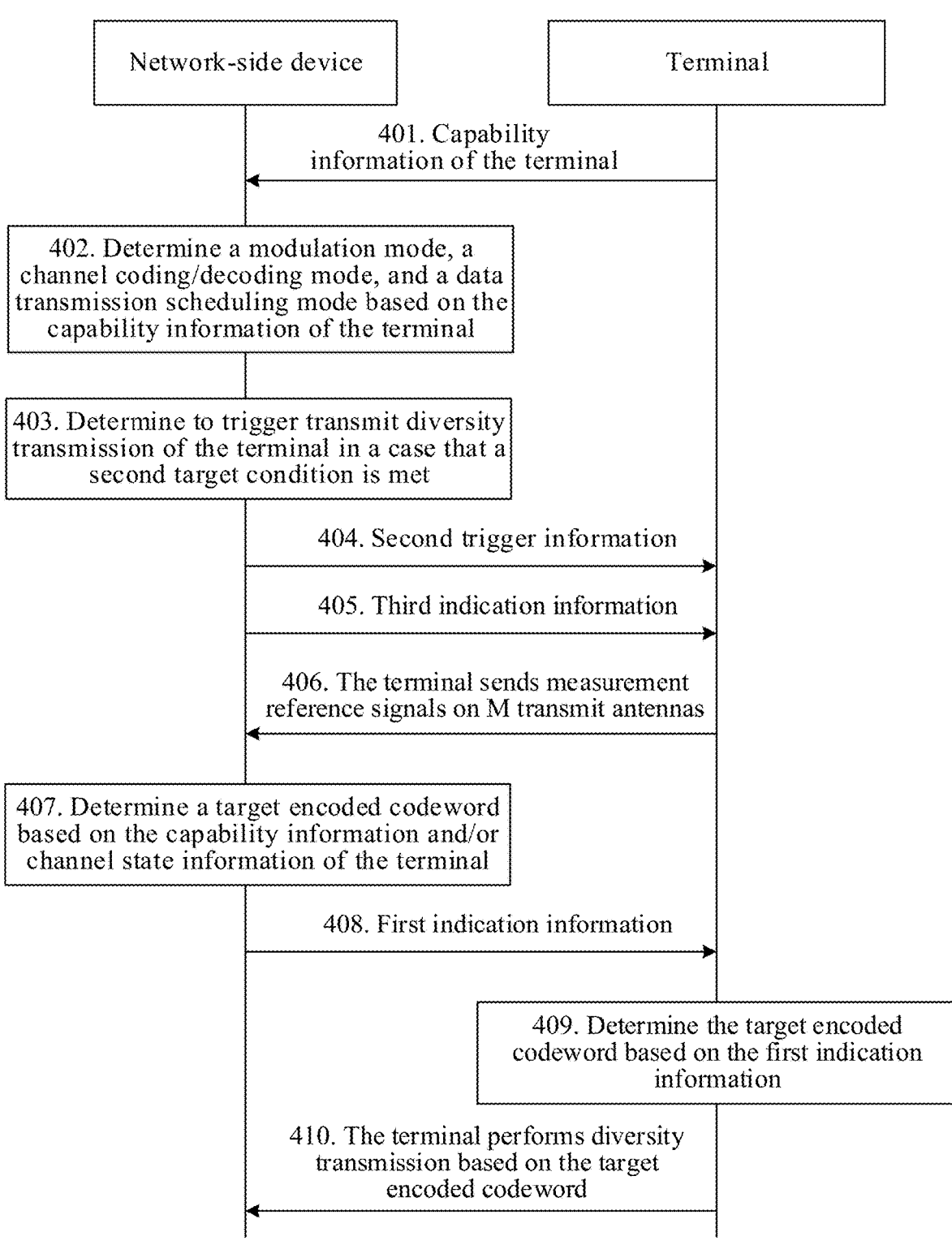
FIG. 6 is a first schematic diagram of signaling interaction of a diversity transmission method according to an embodiment of this application.

The following describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first," "second," and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a Long Term Evolution (LTE)/LTE-Advanced (LTE-A) system, and can also be used in other wireless communications systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the New Radio (NR) system is described for an illustrative purpose, and NR terms are used in most of the following descriptions. These technologies may also be applied to other communications systems than the NR system, for example, a 6th Generation (6G) communications system.

FIG. 1 is a schematic diagram of a wireless communications system to which an embodiment of this application can be applied. The wireless communications system shown in FIG. 1 includes a terminal 11 and a network-side device 12. The terminal 11 may be a terminal-side device such as Backscatter Communication UE (BSC UE), a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), an Augmented Reality (AR) or Virtual Reality (VR) device, a robot, a wearable device, Vehicle User Equipment (VUE), Pedestrian User Equipment (PUE), a smart home (a home device having a wireless communication function, such as a refrigerator, a television, a washing machine, or furniture), a game console, a personal computer, a teller machine, or a self-service machine. The BSC UE includes a tag in a Radio Frequency IDentification (RFID) system, a passive IoT device, a semi-passive IoT device, or the like. The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, or the like. It should be noted that a specific type of the terminal 11 is not limited in the embodiments of this application. The network-side device 12 may include an access network device or a core network device. The access network device may also be referred to as a radio access network device, a Radio Access Network (RAN), a radio access network function, or a radio access network element. The access network device 12 may include a base station, a Wireless Local Area Network (WLAN) access point, a Wireless Fidelity (Wi-Fi) node, or the like. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a Transmission and Reception Point (TRP), or another appropriate term in the art. As long as the same technical effect is achieved, the base station is not limited to specific technical terms. It should be noted that in the embodiments of this application, only a base station in an NR system is used as an example for description, but a specific type of the base station is not limited. The core network device may include but is not limited to at least one of the following: a core network node, a core network function, a Mobility Management Entity (MME), an Access and Mobility Management Function (AMF), a Session Management Function (SMF), a User Plane Function (UPF), a Policy Control Function (PCF), a Policy and Charging Rules Function (PCRF), an Edge Application Server Discovery Function (EASDF), Unified Data Management (UDM), a Unified Data Repository (UDR), a Home Subscriber Server (HSS), a Centralized Network Configuration (CNC), a Network Repository Function (NRF), a Network Exposure Function (NEF), a Local NEF (or L-NEF), a Binding Support Function (BSF), an Application Function (AF), or the like. It should be noted that in the embodiments of this application, only a core network device in the NR system is used as an example for description, but a specific type of the core network device is not limited.

A diversity transmission method provided in the embodiments of this application may be applied to a scenario of multi-antenna transmit diversity transmission to resolve problems of high system implementation complexity and a high probability of error detection in the related art. A target encoded codeword provided in the embodiments of this application meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

In the embodiments of this application, $2^k$ (k=1, 2, 3, . . . ) antenna transmit diversity codewords may be obtained through construction based on the target encoding structure, and a transmit diversity order is $2^k$. Apparently, more than one encoded codeword meets the target encoding structure. The target encoded codeword in the embodiments of this application is at least one of a plurality of encoded codewords that meet the target encoding structure.

In comparison with the related art, in the embodiments of this application, in a case that a terminal obtains the target encoded codeword meeting the target encoding structure and performs multi-antenna transmit diversity transmission by using the target encoded codeword, the target encoded codeword designed based on the target encoding structure can not only ensure a diversity gain, but also reduce types of reflection coefficients required on each antenna, that is, reduce types of load impedances required on each antenna, thereby reducing system implementation complexity and effectively reducing a probability of error detection.

The diversity transmission method provided in the embodiments of this application is hereinafter described in detail by using some embodiments and application scenarios thereof with reference to the accompanying drawings. It may be understood that different embodiments may be combined with each other, and that same or similar concepts or step processes are not repeated.

FIG. 2 is a first schematic flowchart of a diversity transmission method according to an embodiment of this application. As shown in FIG. 2, the method includes steps 201 and 202.

Step 201: A terminal determines a target encoded codeword.

Step 202: The terminal performs diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

It should be noted that this embodiment of this application may be applied to a scenario of multi-antenna transmit diversity transmission of backscatter communication. The terminal includes backscatter communication user equipment (BSC UE). It may be understood that the BSC UE may include but is not limited to a tag in a radio frequency identification (RFID) system, a passive IoT device, a semi-passive IoT device, and the like.

In some implementations, the target encoded codeword may also be referred to as a codeword matrix, a block encoding matrix, a space time block encoding matrix, a block encoded codeword, or a space time block encoded codeword.

In the diversity transmission method provided in this embodiment of this application, the terminal determines the target encoded codeword meeting the target encoding structure and performs multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in the embodiments of this application can not only ensure a diversity gain, but also reduce types of reflection coefficients required on each antenna, that is, reduce types of load impedances required on each antenna, thereby reducing system implementation complexity and effectively reducing a probability of error detection.

In some implementations, a characteristic of the target encoded codeword provided in this embodiment of this application is that the target encoded codeword with N×N dimensions meets the target encoding structure, and the target encoding structure may be represented by S; and $$S = \begin{bmatrix} S_{12} & S_{34}^* \\ S_{34} & -S_{12}^* \end{bmatrix},$$

where elements in S include $S_{12}$, $S_{34}$, $S_{34}^*$, and $-S_{12}^*$; S is the encoding matrix with N×N dimensions; $N=2^k$, and k is a positive integer; $S_{12}$ is the first basic element, $S_{34}$ is the second basic element, $S_{34}^*$ is the second generation element, and $-S_{12}^*$ is the first generation element; and $S_{12}$, $S_{34}$, $S_{34}^*$, and $-S_{12}^*$ meet at least one of the following:

in a case that N is equal to 2, $S_{12}$, $S_{34}$, $S_{34}^*$, and $-S_{12}^*$ are all complex numbers, $S_{34}^*$ is a conjugate complex number of $S_{34}$, and $-S_{12}^*$ is an opposite number of a conjugate complex number of $S_{12}$; and in a case that N is greater than 2, $S_{12}$, $S_{34}$, $S_{34}^*$, and $-S_{12}^*$ are all block matrices with L×L dimensions, L=N/2, elements in each block matrix are all complex numbers, $S_{34}^*$ is a conjugate matrix of $S_{34}$, and $-S_{12}^*$ is an opposite number of a conjugate matrix of $S_{12}$. Apparently, the target encoding structure constructed in this embodiment of this application may be extended to $2^k$ (k=1, 2, 3, . . . ) antenna transmit diversity codewords.

The target encoding structure determines that the target encoded codeword designed based on the target encoding structure can not only ensure the diversity gain, but also reduce the types of reflection coefficients required on each antenna, that is, reduce the types of load impedances required on each antenna, thereby reducing the system implementation complexity and effectively reducing the probability of error detection.

In this embodiment of this application, the target encoded codeword (that is, a transmit diversity codebook) is designed based on the target encoding structure. Therefore, when the target encoded codeword meeting the target encoding structure is applied to a scenario of two-antenna transmit diversity transmission, the target encoded codeword can achieve a full diversity gain and a full rate. In this case, the target encoded codeword belongs to an OSTBC codebook. When the target encoded codeword meeting the target encoding structure is applied to a scenario of transmit diversity transmission with more than two transmit antennas, the target encoded codeword can achieve a diversity gain slightly worse than a full diversity gain and achieve full rate transmission. In this case, the target encoded codeword belongs to a QSTBC codebook.

The following separately describes scenarios in which the target encoded codeword provided in this embodiment of this application is applied to two-antenna transmit diversity transmission, four-antenna transmit diversity transmission, and $2^k$-antenna transmit diversity transmission.

I. Two-Antenna Transmit Diversity Transmission

In the scenario of two-antenna transmit diversity transmission, the target encoded codeword has 2×2 dimensions, that is, N is equal to 2. In a case of $S_{12}=s_1$, $S_{34}=s_2$, $S_{34}{}^*=s_2{}^*$, and $-S_{12}{}^*=-S_1{}^*$, the target encoded codeword is $S_2$; and $$S_2 = \begin{bmatrix} s_1 & s_2^* \\ s_2 & -s_1^* \end{bmatrix},$$

where elements in $S_2$ are all complex numbers, $s_2{}^*$ is a conjugate complex number of $s_2$, and $-s_1{}^*$ is an opposite number of a conjugate complex number of $s_1$.

Based on the target encoded codeword $S_2$, it is assumed that in a current symbol cycle, a symbol sent on antenna 1 is denoted as $s_1$, and a symbol sent on antenna 2 is denoted as $s_2{}^*$; but in a next symbol cycle, a symbol sent on antenna 1 is $s_2$, and a symbol sent on antenna 2 is $-s_1{}^*$. Based on the foregoing analysis, it can be learned according to a definition of an OSTBC codeword that $S_2$ belongs to an OSTBC codebook. Therefore, transmit diversity transmission performed based on $S_2$ can achieve a full diversity gain and full rate transmission.

The following analyzes differences between the target encoded codeword $S_2$ provided in this embodiment of this application and a standard Alamouti code and an extended Alamouti codeword in the related art in backscatter communication.

Assuming that the terminal performs transmission based on BPSK modulation symbols, according to a mapping principle of backscatter communication, a mapping rule between symbols 0 and 1 and reflection coefficients is $$\begin{cases} 0 \Leftrightarrow \Gamma_1 = |\Gamma|e^{j\Theta} \\ 1 \Leftrightarrow \Gamma_2 = |\Gamma|e^{j(\Theta+\pi)} \end{cases},$$

10 that is, two phase-inverted load impedances are controlled to represent the symbols 0 and 1.

Table 1 shows an encoding table for simultaneously sending different symbols on two antennas by using the diversity encoded codeword $S_2$ provided in this embodiment of this application.

TABLE 1

Two-antenna transmit diversity encoding table of the diversity encoded codeword provided in this embodiment of this application

| 00 | Antenna 1 | Antenna 2 | 01 | Antenna 1 | Antenna 2 |
|---|---|---|---|---|---|
| t | $|\Gamma|e^{j\Theta}$ | $|\Gamma|e^{-j\Theta}$ | t | $|\Gamma|e^{j\Theta}$ | $|\Gamma|e^{-j(\Theta+\pi)}$ |
| t + T | $|\Gamma|e^{j\Theta}$ | $|\Gamma|e^{-j(\Theta+\pi)}$ | t + T | $|\Gamma|e^{j(\Theta+\pi)}$ | $|\Gamma|e^{-j(\Theta+\pi)}$ |
| 10 | Antenna 1 | Antenna 2 | 11 | Antenna 1 | Antenna 2 |
| t | $|\Gamma|e^{j(\Theta+\pi)}$ | $|\Gamma|e^{-j\Theta}$ | t | $|\Gamma|e^{j(\Theta+\pi)}$ | $|\Gamma|e^{-j(\Theta+\pi)}$ |
| t + T | $|\Gamma|e^{j\Theta}$ | $|\Gamma|e^{-j\Theta}$ | t + T | $|\Gamma|e^{j(\Theta+\pi)}$ | $|\Gamma|e^{-j\Theta}$ |

For comparison, Table 2 and Table 3 show encoding tables for simultaneously sending different symbols on two antennas by using the standard Alamouti codeword and the extended Alamouti codeword in the related art. The standard Alamouti codeword is $$\begin{bmatrix} s_1 & s_2 \\ -s_2^* & s_1^* \end{bmatrix},$$

and the extended Alamouti codeword is $$\begin{bmatrix} s_1 & s_2 \\ s_2^* & -s_1^* \end{bmatrix}.$$

TABLE 2

Two-antenna transmit diversity encoding table of the standard Alamouti codeword in the related art

| 00 | Antenna 1 | Antenna 2 | 01 | Antenna 1 | Antenna 2 |
|---|---|---|---|---|---|
| t | $|\Gamma|e^{j\Theta}$ | $|\Gamma|e^{j\Theta}$ | t | $|\Gamma|e^{j\Theta}$ | $|\Gamma|e^{j(\Theta+\pi)}$ |
| t + T | $|\Gamma|e^{-j(\Theta+\pi)}$ | $|\Gamma|e^{-j\Theta}$ | t + T | $|\Gamma|e^{-j\Theta}$ | $|\Gamma|e^{-j\Theta}$ |
| 10 | Antenna 1 | Antenna 2 | 11 | Antenna 1 | Antenna 2 |
| t | $|\Gamma|e^{j(\Theta+\pi)}$ | $|\Gamma|e^{j\Theta}$ | t | $|\Gamma|e^{j(\Theta+\pi)}$ | $|\Gamma|e^{j(\Theta+\pi)}$ |
| t + T | $|\Gamma|e^{-j(\Theta+\pi)}$ | $|\Gamma|e^{-j(\Theta+\pi)}$ | t + T | $|\Gamma|e^{-j\Theta}$ | $|\Gamma|e^{-j(\Theta+\pi)}$ |

TABLE 3

Two-antenna transmit diversity encoding table of the extended Alamouti codeword in the related art

| 00 | Antenna 1 | Antenna 2 | 01 | Antenna 1 | Antenna 2 |
|---|---|---|---|---|---|
| t | $|\Gamma|e^{j\Theta}$ | $|\Gamma|e^{j\Theta}$ | t | $|\Gamma|e^{j\Theta}$ | $|\Gamma|e^{j(\Theta+\pi)}$ |
| t + T | $|\Gamma|e^{-j\Theta}$ | $|\Gamma|e^{-j(\Theta+\pi)}$ | t + T | $|\Gamma|e^{-j(\Theta+\pi)}$ | $|\Gamma|e^{-j(\Theta+\pi)}$ |
| 10 | Antenna 1 | Antenna 2 | 11 | Antenna 1 | Antenna 2 |
| t | $|\Gamma|e^{j(\Theta+\pi)}$ | $|\Gamma|e^{j\Theta}$ | t | $|\Gamma|e^{j(\Theta+\pi)}$ | $|\Gamma|e^{j(\Theta+\pi)}$ |
| t + T | $|\Gamma|e^{-j\Theta}$ | $|\Gamma|e^{-j\Theta}$ | t + T | $|\Gamma|e^{-j(\Theta+\pi)}$ | $|\Gamma|e^{-j\Theta}$ |

As can be learned according to Table 1, based on the diversity encoded codeword provided in this embodiment of this application, antenna 1 requires only two coefficients $|\Gamma|e^{j\theta}$ and $|\Gamma|e^{j(\theta+\pi)}$; and antenna 2 also requires only two coefficients $|\Gamma|e^{-j\theta}$ and $|\Gamma|e^{-j(\theta+\pi)}$. In other words, based on the diversity encoded codeword provided in this embodiment of this application, only two types of load impedances are required on each antenna.

As can be learned according to Table 2 and Table 3, based on the standard Alamouti codeword and the extended Alamouti codeword in the related art, both antenna 1 and antenna 2 require four coefficients $|\Gamma|e^{j\theta}$, $|\Gamma|e^{-(\theta+\pi)}$, $|\Gamma|e^{j(\theta+\pi)}$, and $|\Gamma|e^{-j(\theta+\pi)}$. In other words, four types of load impedances are required on each antenna in the related art.

Apparently, in comparison with the related art, the target encoded codeword designed based on the target encoding structure in this embodiment of this application can not only ensure the diversity gain, but also reduce the types of reflection coefficients required on each antenna, that is, reduce the types of load impedances required on each antenna, thereby reducing the system implementation complexity and effectively reducing the probability of error detection.

II. Four-Antenna Transmit Diversity Transmission

In the scenario of four-antenna transmit diversity transmission, the target encoded codeword has 4×4 dimensions, that is, N is equal to 4. In a case of $$S_{12} = \begin{bmatrix} s_1 & s_2^* \\ s_2 & -s_1^* \end{bmatrix},$$

$$S_{34} = \begin{bmatrix} s_3 & s_4^* \\ s_4 & -s_3^* \end{bmatrix},$$

$$S_{34}^* = \begin{bmatrix} s_3^* & s_4 \\ s_4^* & -s_3 \end{bmatrix},$$

and $$-S_{12}^* = \begin{bmatrix} -s_1^* & -s_2 \\ -s_2^* & s_1 \end{bmatrix},$$

the target encoded codeword is $S_4$; and $$S_4 = \begin{bmatrix} s_1 & s_2^* & s_3^* & s_4 \\ s_2 & -s_1^* & s_4^* & -s_3 \\ s_3 & s_4^* & -s_1^* & -s_2 \\ s_4 & -s_3^* & -s_2^* & s_1 \end{bmatrix},$$

where elements in $S_4$ are all complex numbers, $s_2^*$ is a conjugate complex number of $s_2$, $s_3^*$ is a conjugate complex number of $s_3$, $s_4^*$ is a conjugate complex number of $s_4$, $-s_1^*$ is an opposite number of a conjugate complex number of $s_1$, $-s_2^*$ is an opposite number of a conjugate complex number of $s_2$, $-s_3^*$ is an opposite number of a conjugate complex number of $s_3$, $-s_2$ is an opposite number of $s_2$, and $-s_3$ is an opposite number of $s_3$.

Based on the target encoded codeword $S_4$, it is assumed that in a current symbol cycle (denoted as a first symbol cycle), a symbol sent on antenna 1 is denoted as $s_1$, and a symbol sent on antenna 2 is denoted as $s_2^*$, and a symbol sent on antenna 3 is denoted as $S_3^*$, and a symbol sent on antenna 4 is denoted as $S_4$.

In a symbol cycle (denoted as a second symbol cycle) next to the first symbol cycle, a symbol sent on antenna 1 is $s_2$, a symbol sent on antenna 2 is $-s_1^*$, a symbol sent on antenna 3 is $s_4^*$, and a symbol sent on antenna 4 is $-s_3$.

In a symbol cycle (denoted as a third symbol cycle) next to the second symbol cycle, a symbol sent on antenna 1 is $s_3$, a symbol sent on antenna 2 is $s_4^*$, a symbol sent on antenna 3 is $-s_1^*$, and a symbol sent on antenna 4 is $-s_2$.

In a symbol cycle (denoted as a fourth symbol cycle) next to the third symbol cycle, a symbol sent on antenna 1 is $s_4$, a symbol sent on antenna 2 is $-s_3^*$, a symbol sent on antenna 3 is $-s_2^*$, and a symbol sent on antenna 4 is $s_1$.

Based on the foregoing analysis, it can be learned according to a definition of a QSTBC codeword that $S_4$ belongs to a QSTBC codebook. Therefore, transmit diversity transmission performed based on $S_4$ can achieve a diversity gain slightly worse than a full diversity gain and achieve full rate transmission.

The following analyzes differences between the target encoded codeword $S_4$ provided in this embodiment of this application and an ABBA QSTBC (for example, a codebook is $$S_{ABBA} = \begin{bmatrix} s_1 & -s_2 & s_3 & s_4 \\ s_2^* & -s_1^* & s_4^* & -s_3^* \\ s_3 & s_4 & s_1 & s_2 \\ s_4^* & -s_3^* & s_2^* & -s_1^* \end{bmatrix}$$

in the related art in backscatter communication.

Assuming that the terminal performs transmission based on BPSK modulation symbols, according to a mapping principle of backscatter communication, a mapping rule between symbols 0 and 1 and reflection coefficients is $$\begin{cases} 0 \Leftrightarrow \Gamma_1 = |\Gamma|e^{j\theta} \\ 1 \Leftrightarrow \Gamma_2 = |\Gamma|e^{j(\theta+\pi)} \end{cases},$$

that is, two phase-inverted load impedances are controlled to represent the symbols 0 and 1.

FIGS. 3A-3D show four encoding tables for simultaneously sending different symbols on four antennas by using the diversity encoded codeword $S_4$ provided in this embodiment of this application. For comparison, FIGS. 4A-4D show four encoding tables for simultaneously sending different symbols on four antennas by using the ABBA QSTBC in the related art.

As can be learned according to FIGS. 3A-3D, based on the diversity encoded codeword provided in this embodiment of this application, antenna 1 requires only two coefficients $|\Gamma|^{j\theta}$ and $|\Gamma|^{j(\theta+\pi)}$, antenna 2 also requires only two coefficients $|\Gamma|e^{-j\theta}$ and, $|\Gamma|e^{-j(\theta+\pi)}$, antenna 3 also requires only two coefficients $|\Gamma|e^{-j\theta}$ and $||\Gamma|e^{j(\theta+\pi)}$, and antenna 4 also requires only two coefficients $|\Gamma|e^{j\theta}$ and $|\Gamma|e^{j(\theta+\pi)}$. In other words, based on the diversity encoded codeword provided in this embodiment of this application, only two types of load impedances are required on each antenna.

As can be learned according to FIGS. 4A-4D, based on the ABBA QSTBC in the related art, each of antenna 1, antenna 2, antenna 3, and antenna 4 requires four coefficients $|\Gamma|e^{j\theta}$, $|\Gamma|e^{-j(\theta+\pi)}$, $|\Gamma|e^{j(\theta+\pi)}$, and $|\Gamma|e^{-(\theta+\pi)}$. In other words, four types of load impedances are required on each antenna in the related art.

Apparently, in comparison with the related art, the target encoded codeword designed based on the target encoding structure in this embodiment of this application can not only ensure the diversity gain, but also reduce the types of reflection coefficients required on each antenna, that is, reduce the types of load impedances required on each antenna, thereby reducing the system implementation complexity and effectively reducing the probability of error detection.

III. $2^k$-Antenna Transmit Diversity Transmission

In the scenario of $2^k$-antenna transmit diversity transmission, the target encoded codeword has N×N dimensions. The target encoded codeword designed based on the target encoding structure in this embodiment of this application may be extended to $2^k$ (k=1, 2, 3, . . . ) antenna transmit diversity codewords. A design principle is similar to design principles of S, $S_2$, and $S_4$. Details are not described herein again.

The following describes an implementation of a transmit diversity transmission scheme based on the target encoded codeword provided in this embodiment of this application.

In this embodiment of this application, an implementation of determining the target encoded codeword by the terminal in step 201 may include either of the following manners.

Determining manner 1: A network-side device determines the target encoded codeword and sends indication information of the target encoded codeword to the terminal.

Determining manner 2: The terminal autonomously determines the target encoded codeword.

This embodiment of this application further provides an implementation of triggering diversity transmission of the terminal. Specifically, the implementation may include either of the following manners.

Trigger manner 1: The terminal triggers diversity transmission of the terminal.

Trigger manner 2: The network-side device triggers diversity transmission of the terminal.

On this basis, the diversity transmission method provided in this embodiment of this application may include at least the following scenarios.

Scenario 1: The network-side device triggers diversity transmission of the terminal, and the network-side device determines and indicates codebook information.

Scenario 2: The terminal triggers diversity transmission of the terminal, and the network-side device determines and indicates codebook information.

Scenario 3: The network-side device triggers diversity transmission of the terminal, and the terminal determines and indicates codebook information.

Scenario 4: The terminal triggers diversity transmission of the terminal, and the terminal determines and indicates codebook information.

Before describing scenario 1 to scenario 4, the following first describes determining manner 1, determining manner 2, trigger manner 1, and trigger manner 2.

Determining manner 1: The network-side device determines the target encoded codeword and sends first indication information to the terminal, where the first indication information is used to indicate the target encoded codeword. The terminal receives the first indication information sent by the network-side device, and the terminal determines the target encoded codeword based on the first indication information. For example, the terminal parses the first indication information to obtain a codeword structure parameter, and generates the target encoded codeword by using the codeword structure parameter.

In some implementations, the first indication information includes at least one of the following:

(1) a transmit diversity order and a codeword matrix indicator, where for example, the codeword matrix indicator includes an index of the codeword or a number of the codeword; and (2) codebook dimension indication information and a codeword matrix indicator, where for example, the codebook dimension indication information is used to indicate a codebook dimension of the target encoded codeword, and the codebook dimension is, for example, the transmit diversity order.

In some implementations, a manner of carrying the first indication information includes one of the following:

(1) the first indication message is carried by downlink control information Downlink Control Information (DCI), where it may be understood that the DCI may be a newly designed DCI format or existing DCI;

(2) the first indication information is carried by a preamble sequence;

(3) the first indication information is carried by a signal sequence, where the signal sequence includes a signal sequence scrambled by a BSC UE ID or a random number related to BSC UE, or a signal sequence carrying a BSC UE ID; and (4) the first indication information is carried by a Media Access Control (MAC) Control Element (CE).

Trigger manner 1: In a case that a first target condition is met, the terminal actively sends first trigger information to the network-side device, where the first trigger information is used to indicate to the network-side device that the terminal triggers diversity transmission.

In some implementations, a manner of carrying the first trigger information includes one of the following:

the first trigger information is carried by a preamble sequence;

the first trigger information is carried by a signal sequence, where the signal sequence includes a signal sequence scrambled by a BSC UE ID or a random number related to BSC UE, or a signal sequence carrying a BSC UE ID; and the first trigger information is carried by a MAC CE.

The first target condition includes at least one of the following:

(1) energy of a back-transmitted signal of the terminal is lower than a first threshold;

(2) the terminal is located at an edge of a cell;

(3) the number of Negative ACKnowledgements (NACK) sent by the terminal exceeds a second threshold; and (4) energy of a downlink received signal is lower than a third threshold.

Determining manner 2: The terminal autonomously determines the target encoded codeword.

In some implementations, the terminal determines the target encoded codeword based on capability information and/or channel state information of the terminal. Then the terminal sends second indication information to the network-side device, where the second indication information is used to indicate the target encoded codeword.

In some implementations, the second indication information includes at least one of the following:

a transmit diversity order and a codeword matrix indicator; and codebook dimension indication information and a codeword matrix indicator.

In some implementations, a manner of carrying the second indication information includes one of the following:

the second indication information is carried by a MAC CE;

the second indication information is carried by a preamble; and the second indication information is carried by a sequence.

In some implementations, the terminal determines the target encoded codeword only in a case that a first target condition is met. The first target condition includes at least one of the following:

(1) energy of a back-transmitted signal of the terminal is lower than a first threshold;

(2) the terminal is located at an edge of a cell;

(3) the number of NACK sent by the terminal exceeds a second threshold; and (4) energy of a downlink received signal is lower than a third threshold.

In some implementations, the second indication information includes at least one of the following:

(1) a transmit diversity order and a codeword matrix indicator; and (2) codebook dimension indication information and a codeword matrix indicator.

In some implementations, a manner of carrying the second indication information includes one of the following:

(1) the second indication information is carried by a MAC CE;

(2) the second indication information is carried by a preamble; and (3) the second indication information is carried by a sequence, where it may be understood that the sequence herein may be a Sounding Reference Signal (SRS).

Trigger manner 2: The terminal receives second trigger information sent by the network-side device, where the second trigger information is used to trigger diversity transmission of the terminal.

In some implementations, a manner of carrying the second trigger information includes one of the following:

the second trigger message is carried by DCI;

the second trigger information is carried by a preamble sequence;

the second trigger information is carried by a signal sequence, where the signal sequence includes a signal sequence scrambled by a BSC UE ID or a random number related to BSC UE, or a signal sequence carrying a BSC UE ID; and the second trigger information is carried by a MAC CE.

In this embodiment of this application, the network-side device sends third indication information to the terminal, where the third indication information is used to instruct the terminal to send measurement reference signals on M transmit antennas. The terminal receives the third indication information sent by the network-side device, where the third indication information is used to instruct the terminal to send the measurement reference signals on the M transmit antennas.

The terminal sends the measurement reference signals on the M transmit antennas based on the third indication information.

In some implementations, that the terminal sends the measurement reference signals on the M transmit antennas based on the third indication information includes:

the terminal separately sends the measurement reference signals on the M transmit antennas at different times based on the third indication information; or the terminal separately sends the measurement reference signals on the M transmit antennas at a same time based on the third indication information, where measurement reference signals sent on different transmit antennas have been scrambled by random numbers related to index information of the corresponding antennas.

In some implementations, the third indication information includes at least one of the following:

information used to indicate a time or cycle of a measurement reference signal sent by the terminal on each of the M transmit antennas;

information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following:

the third indication information is carried by DCI;

the third indication information is carried by a preamble sequence;

the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

FIG. 5 is a second schematic flowchart of a diversity transmission method according to an embodiment of this application. As shown in FIG. 5, the method includes steps 301 and 302.

Step 301: A network-side device determines a target encoded codeword.

Step 302: The network-side device sends first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

It should be noted that this embodiment of this application may be applied to a scenario of multi-antenna transmit diversity transmission of backscatter communication. The terminal includes BSC UE. It may be understood that the BSC UE may include but is not limited to a tag in an RFID system, a passive IoT device, a semi-passive IoT device, and the like.

In the diversity transmission method provided in this embodiment of this application, the network-side device determines the target encoded codeword meeting the target encoding structure and sends the target encoded codeword to the terminal, to instruct the terminal to perform multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

In some implementations, the first indication information includes at least one of the following:

a transmit diversity order and a codeword matrix indicator; and codebook dimension indication information and a codeword matrix indicator.

In some implementations, a manner of carrying the first indication information includes one of the following:

the first indication message is carried by DCI;

the first indication information is carried by a preamble sequence;

the first indication information is carried by a signal sequence, where the signal sequence includes a signal sequence scrambled by a BSC UE ID or a random number related to BSC UE, or a signal sequence carrying a BSC UE ID; and the first indication information is carried by a MAC CE.

In some implementations, a second target condition includes at least one of the following:

energy of a back-transmitted signal of the terminal is lower than a first threshold;

the terminal is located at an edge of a cell;

the number of NACKs sent by the terminal exceeds a second threshold; and the network-side device receives first trigger information sent by the terminal, where the first trigger information is used to indicate to the network-side device that the terminal triggers diversity transmission.

In this embodiment of this application, an implementation of determining the target encoded codeword by the network-side device in a case that the second target condition is met may include: in the case that the second target condition is met, the network-side device determines the target encoded codeword based on capability information and/or channel state information of the terminal.

In some implementations, in the case that the second target condition is met, the network-side device sends third indication information to the terminal, where the third indication information is used to instruct the terminal to send measurement reference signals on M transmit antennas.

In some implementations, the third indication information includes at least one of the following:

(1) information used to indicate a time or cycle of a measurement reference signal sent by the terminal on each of the M transmit antennas;

(2) information used to indicate a sequence of the measurement reference signal sent by the terminal on each of the M transmit antennas; and (3) information used to indicate a frequency, a bandwidth, or a frequency shift of the measurement reference signal sent by the terminal on each of the M transmit antennas.

The following separately illustrates the foregoing four scenarios by using four specific embodiments.

Scenario 1: The network-side device triggers diversity transmission of the terminal, and the network-side device determines and indicates a codebook.

FIG. 6 is a first schematic diagram of signaling interaction of a diversity transmission method according to an embodiment of this application. As shown in FIG. 6, the method is implemented by a terminal and a network-side device in cooperation, and the method includes steps 401 to 410.

Step 401: The terminal reports capability information of the terminal to the network-side device.

In some implementations, the terminal includes BSC UE; and the capability information of the terminal includes at least one of the following: a modulation mode supported by the BSC UE and an antenna capability of the BSC UE.

Step 402: The network-side device determines a modulation mode, a channel coding/decoding mode, and a data transmission scheduling mode based on the capability information of the terminal.

Step 403: In a case that a second target condition is met, the network-side device determines to trigger transmit diversity transmission of the terminal.

In some implementations, the second target condition includes at least one of the following: energy of a back-transmitted signal of the terminal is lower than a first threshold; the terminal is located at an edge of a cell; and the number of negative acknowledgements NACKs sent by the terminal exceeds a second threshold.

Step 404: The network-side device sends second trigger information to the terminal, where the second trigger information is used to trigger diversity transmission of the terminal.

Step 405: The network-side device sends third indication information to the terminal, where the third indication information is used to instruct the terminal to send measurement reference signals on M transmit antennas.

In some implementations, the third indication information includes at least one of the following: information used to indicate a time or cycle of a measurement reference signal sent by the terminal on each of the M transmit antennas; information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following: the third indication information is carried by DCI; the third indication information is carried by a preamble sequence; the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

Step 406: After the terminal receives the third indication information sent by the network-side device, the terminal sends the measurement reference signals on the M transmit antennas based on the third indication information.

In some implementations, an implementation of sending the measurement reference signals on the M transmit antennas by the terminal based on the third indication information may include: the terminal separately sends the measurement reference signals on the M transmit antennas at different times based on the third indication information; or the terminal separately sends the measurement reference signals on the M transmit antennas at a same time based on the third indication information, where measurement reference signals sent on different transmit antennas have been scrambled by random numbers related to index information of the corresponding antennas.

Step 407: The network-side device determines a target encoded codeword based on the capability information and/or channel state information of the terminal, where the target encoded codeword meets a target encoding structure; the target encoded codeword is an encoding matrix with N×N dimensions; N=2$^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

Step 408: The network-side device sends first indication information to the terminal, where the first indication information is used to indicate the target encoded codeword.

It should be noted that the second trigger information and the first indication information may be carried together, that is, carried together in one piece of signaling, or may be carried separately, that is, carried by different signaling.

Alternatively, the second trigger information and the third indication information may be carried together, that is, carried together in one piece of signaling, or may be carried separately, that is, carried by different signaling.

In some implementations, the first indication information includes at least one of the following: a transmit diversity order and a codeword matrix indicator; and codebook dimension indication information and a codeword matrix indicator.

It should be noted that an execution order of step 404, step 405, and step 408 is not limited in this embodiment of this application. Any one of step 404, step 405, and step 408 may be performed first, or the steps may be performed simultaneously.

Step 409: The terminal determines the target encoded codeword based on the first indication information.

Step 410: The terminal performs diversity transmission based on the target encoded codeword.

In some implementations, a manner of carrying the first indication information includes one of the following: the first indication message is carried by DCI; the first indication information is carried by a preamble sequence; the first indication information is carried by a signal sequence, where the signal sequence includes a signal sequence scrambled by a BSC UE ID or a random number related to BSC UE, or a signal sequence carrying a BSC UE ID; and the first indication information is carried by a MAC CE. It may be understood that the DCI may be a newly designed DCI format or existing DCI.

In the diversity transmission method provided in this embodiment of this application, the network-side device determines the target encoded codeword meeting the target encoding structure and sends the target encoded codeword to the terminal, to instruct the terminal to perform multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

Scenario 2: The terminal triggers diversity transmission of the terminal, and the network-side device determines and indicates a codebook.

Figure 7:
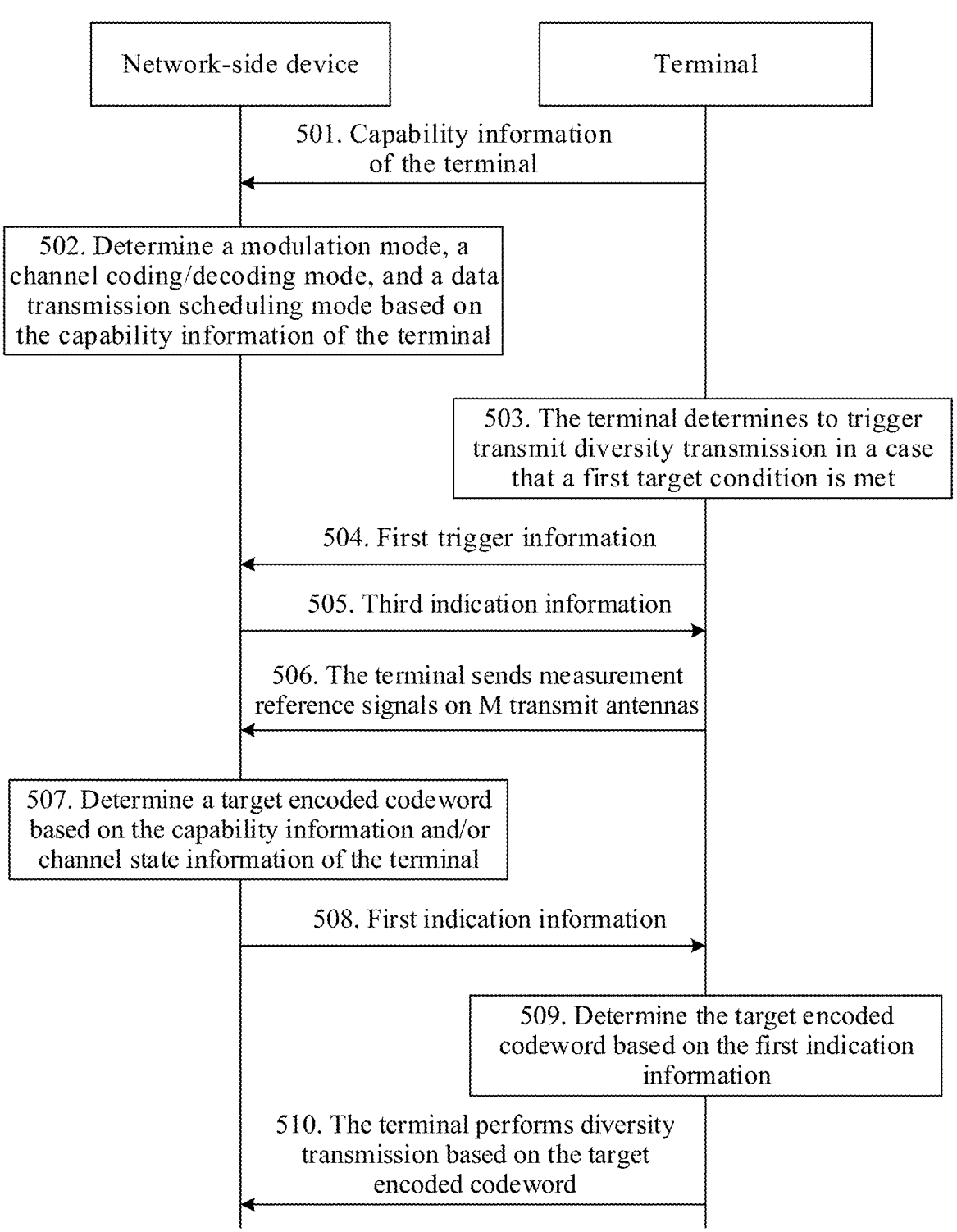
FIG. 7 is a second schematic diagram of signaling interaction of a diversity transmission method according to an embodiment of this application.

FIG. 7 is a second schematic diagram of signaling interaction of a diversity transmission method according to an embodiment of this application. As shown in FIG. 7, the method is implemented by a terminal and a network-side device in cooperation, and the method includes steps 501 to 510.

Step 501: The terminal reports capability information of the terminal to the network-side device.

In some implementations, the terminal includes BSC UE; and the capability information of the terminal includes at least one of the following: a modulation mode supported by the BSC UE and an antenna capability of the BSC UE.

Step 502: The network-side device determines a modulation mode, a channel coding/decoding mode, and a data transmission scheduling mode based on the capability information of the terminal.

Step 503: In a case that a first target condition is met, the terminal determines to trigger transmit diversity transmission.

Step 504: The terminal sends first trigger information to the network-side device, where the first trigger information is used to indicate to the network-side device that the terminal triggers diversity transmission.

Step 505: The network-side device sends third indication information to the terminal, where the third indication information is used to instruct the terminal to send measurement reference signals on M transmit antennas.

In some implementations, the third indication information includes at least one of the following: information used to indicate a time or cycle of a measurement reference signal sent by the terminal on each of the M transmit antennas; information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following: the third indication information is carried by DCI; the third indication information is carried by a preamble sequence; the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

Step 506: After the terminal receives the third indication information sent by the network-side device, the terminal sends the measurement reference signals on the M transmit antennas based on the third indication information.

In some implementations, an implementation of sending the measurement reference signals on the M transmit antennas by the terminal based on the third indication information may include: the terminal separately sends the measurement reference signals on the M transmit antennas at different times based on the third indication information; or the terminal separately sends the measurement reference signals on the M transmit antennas at a same time based on the third indication information, where measurement reference signals sent on different transmit antennas have been scrambled by random numbers related to index information of the corresponding antennas.

Step 507: The network-side device determines a target encoded codeword based on the capability information and/or channel state information of the terminal, where the target encoded codeword meets a target encoding structure; the target encoded codeword is an encoding matrix with N×N dimensions; N=$2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

Step 508: The network-side device sends first indication information to the terminal, where the first indication information is used to indicate the target encoded codeword.

In some implementations, the first indication information includes at least one of the following: a transmit diversity order and a codeword matrix indicator; and codebook dimension indication information and a codeword matrix indicator.

It should be noted that an execution order of step 505 and step 508 is not limited in this embodiment of this application. Either of step 505 and step 508 may be performed first, or the steps may be performed simultaneously.

Step 509: The terminal determines the target encoded codeword based on the first indication information.

Step 510: The terminal performs diversity transmission based on the target encoded codeword.

In some implementations, a manner of carrying the first indication information includes one of the following: the first indication message is carried by DCI; the first indication information is carried by a preamble sequence; the first indication information is carried by a signal sequence, where the signal sequence includes a signal sequence scrambled by a BSC UE ID or a random number related to BSC UE, or a signal sequence carrying a BSC UE ID; and the first indication information is carried by a MAC CE. it may be understood that the DCI may be a newly designed DCI format or existing DCI.

In the diversity transmission method provided in this embodiment of this application, the network-side device determines the target encoded codeword meeting the target encoding structure and sends the target encoded codeword to the terminal, to instruct the terminal to perform multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

Scenario 3: The network-side device triggers diversity transmission of the terminal, and the terminal determines and indicates a codebook.

Figure 8:
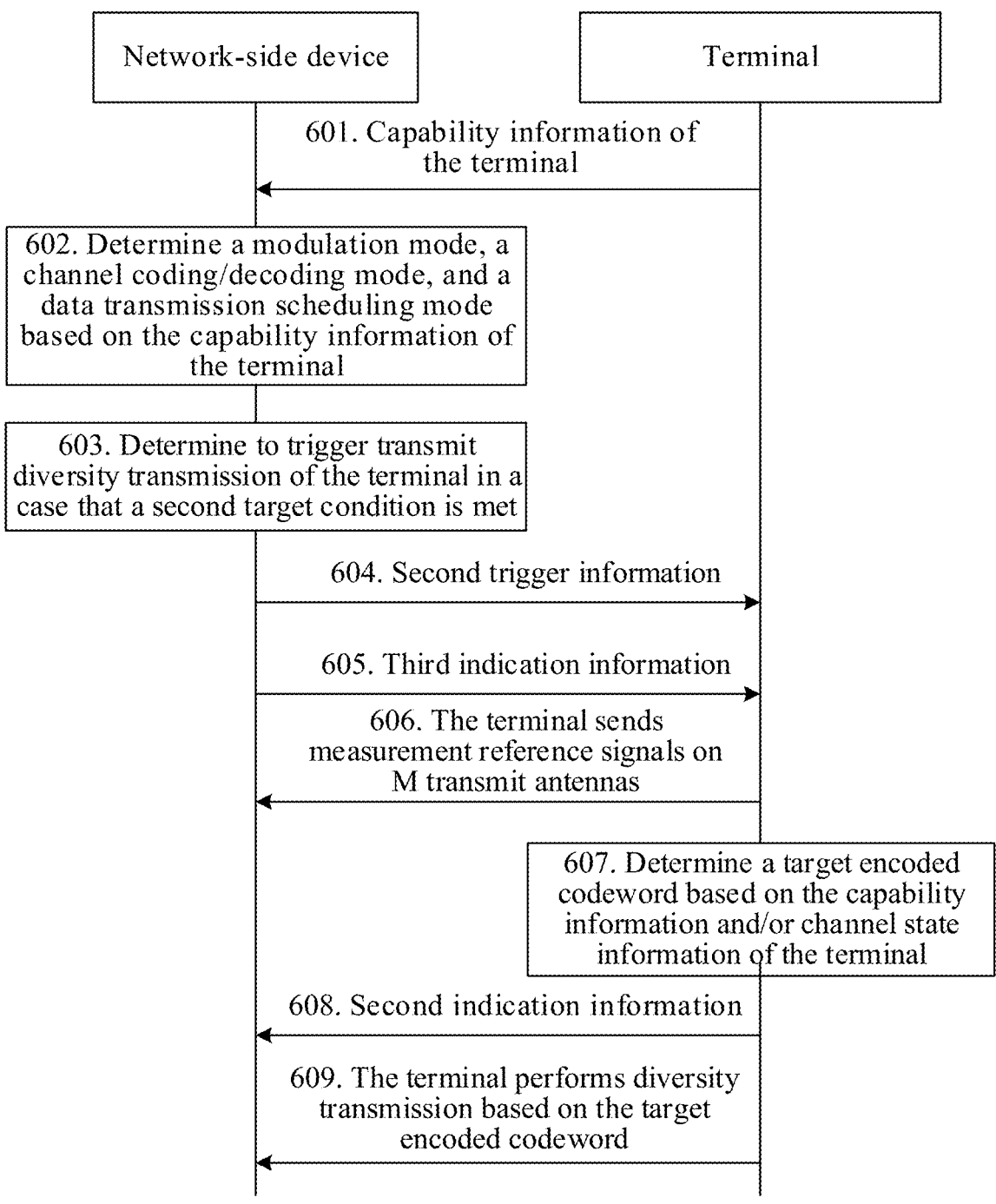
FIG. 8 is a third schematic diagram of signaling interaction of a diversity transmission method according to an embodiment of this application.

FIG. 8 is a third schematic diagram of signaling interaction of a diversity transmission method according to an embodiment of this application. As shown in FIG. 8, the method includes steps 601 to 609.

Step 601: The terminal reports capability information of the terminal to the network-side device.

In some implementations, the terminal includes BSC UE; and the capability information of the terminal includes at least one of the following: a modulation mode supported by the BSC UE and an antenna capability of the BSC UE.

Step 602: The network-side device determines a modulation mode, a channel coding/decoding mode, and a data transmission scheduling mode based on the capability information of the terminal.

Step 603: In a case that a second target condition is met, the network-side device determines to trigger transmit diversity transmission of the terminal.

In some implementations, the second target condition includes at least one of the following: energy of a back-transmitted signal of the terminal is lower than a first threshold; the terminal is located at an edge of a cell; and the number of negative acknowledgements NACKs sent by the terminal exceeds a second threshold.

Step 604: The network-side device sends second trigger information to the terminal, where the second trigger information is used to trigger diversity transmission of the terminal.

Step 605: The network-side device sends third indication information to the terminal, where the third indication information is used to instruct the terminal to send measurement reference signals on M transmit antennas.

It should be noted that the second trigger information and the third indication information may be carried together, that is, carried together in one piece of signaling, or may be carried separately.

In some implementations, the third indication information includes at least one of the following: information used to indicate a time or cycle of a measurement reference signal sent by the terminal on each of the M transmit antennas; information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following: the third indication information is carried by DCI; the third indication information is carried by a preamble sequence; the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

Step 606: After the terminal receives the third indication information sent by the network-side device, the terminal sends the measurement reference signals on the M transmit antennas based on the third indication information.

In some implementations, an implementation of sending the measurement reference signals on the M transmit antennas by the terminal based on the third indication information may include: the terminal separately sends the measurement reference signals on the M transmit antennas at different times based on the third indication information; or the terminal separately sends the measurement reference signals on the M transmit antennas at a same time based on the third indication information, where measurement reference signals sent on different transmit antennas have been scrambled by random numbers related to index information of the corresponding antennas.

Step 607: The terminal determines a target encoded codeword based on the capability information and/or channel state information of the terminal, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

Step 608: The terminal sends second indication information to the network-side device, where the second indication information is used to indicate the target encoded codeword.

In some implementations, the second indication information includes at least one of the following: a transmit diversity order and a codeword matrix indicator; and codebook dimension indication information and a codeword matrix indicator.

In some implementations, a manner of carrying the second indication information includes one of the following: the second indication information is carried by a MAC CE; the second indication information is carried by a preamble; and the second indication information is carried by a sequence.

It should be noted that an execution order of step 604 and step 605 is not limited in this embodiment of this application. Either of step 604 and step 605 may be performed first, or the steps may be performed simultaneously.

Step 609: The terminal performs diversity transmission based on the target encoded codeword.

In the diversity transmission method provided in this embodiment of this application, the terminal autonomously determines the target encoded codeword meeting the target encoding structure and sends the target encoded codeword to the network-side device, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

Scenario 4: The terminal triggers diversity transmission of the terminal, and the terminal determines and indicates the codebook.

Figure 9:
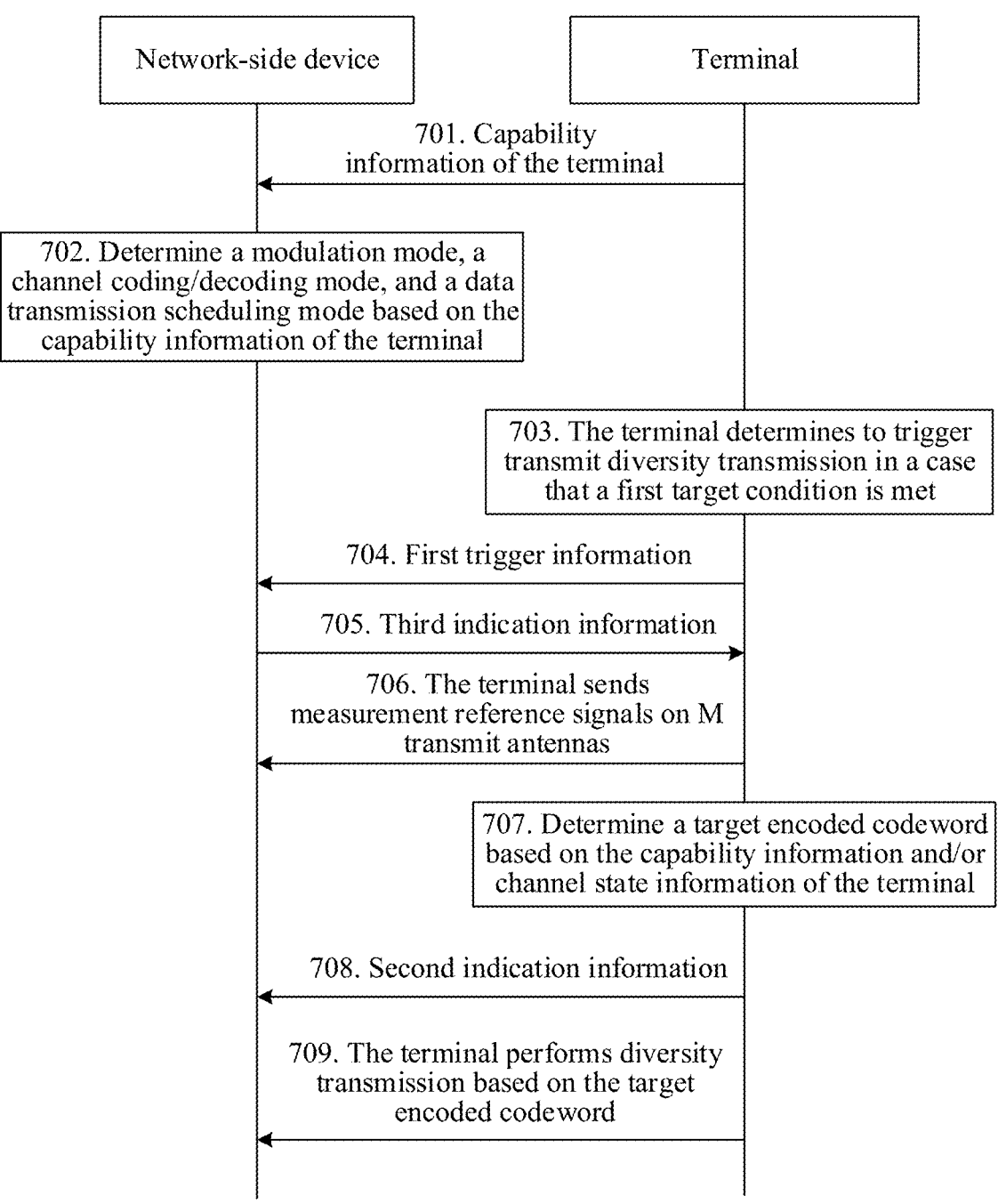
FIG. 9 is a fourth schematic diagram of signaling interaction of a diversity transmission method according to an embodiment of this application.

FIG. 9 is a fourth schematic diagram of signaling interaction of a diversity transmission method according to an embodiment of this application. As shown in FIG. 9, the method includes steps 701 to 709.

Step 701: The terminal reports capability information of the terminal to the network-side device.

In some implementations, the terminal includes BSC UE; and the capability information of the terminal includes at least one of the following: a modulation mode supported by the BSC UE and an antenna capability of the BSC UE.

Step 702: The network-side device determines a modulation mode, a channel coding/decoding mode, and a data transmission scheduling mode based on the capability information of the terminal.

Step 703: In a case that a first target condition is met, the terminal determines to trigger transmit diversity transmission.

Step 704: The terminal sends first trigger information to the network-side device, where the first trigger information is used to indicate to the network-side device that the terminal triggers diversity transmission.

Step 705: The network-side device sends third indication information to the terminal, where the third indication information is used to instruct the terminal to send measurement reference signals on M transmit antennas.

In some implementations, the third indication information includes at least one of the following: information used to indicate a time or cycle of a measurement reference signal sent by the terminal on each of the M transmit antennas; information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following: the third indication information is carried by DCI; the third indication information is carried by a preamble sequence; the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

Step 706: After the terminal receives the third indication information sent by the network-side device, the terminal sends the measurement reference signals on the M transmit antennas based on the third indication information.

In some implementations, an implementation of sending the measurement reference signals on the M transmit antennas by the terminal based on the third indication information US 12,562,783 B2 — columns 25–26

25 may include: the terminal separately sends the measurement reference signals on the M transmit antennas at different times based on the third indication information; or the terminal separately sends the measurement reference signals on the M transmit antennas at a same time based on the third indication information, where measurement reference signals sent on different transmit antennas have been scrambled by random numbers related to index information of the corresponding antennas.

Step 707: The terminal determines a target encoded codeword based on the capability information and/or channel state information of the terminal, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

Step 708: The terminal sends second indication information to the network-side device, where the second indication information is used to indicate the target encoded codeword.

It should be noted that the first trigger information and the second indication information may be carried together, that is, carried together in one piece of signaling, or may be carried separately.

In some implementations, the second indication information includes at least one of the following: a transmit diversity order and a codeword matrix indicator; and codebook dimension indication information and a codeword matrix indicator.

In some implementations, a manner of carrying the second indication information includes one of the following: the second indication information is carried by a MAC CE; the second indication information is carried by a preamble; and the second indication information is carried by a sequence.

It should be noted that an execution order of step 704 and step 708 is not limited in this embodiment of this application. Either of step 704 and step 708 may be performed first, or the steps may be performed simultaneously.

Step 709: The terminal performs diversity transmission based on the target encoded codeword.

In the diversity transmission method provided in this embodiment of this application, the terminal autonomously determines the target encoded codeword meeting the target encoding structure and sends the target encoded codeword to the network-side device, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

The diversity transmission method provided in the embodiments of this application may be performed by a diversity transmission apparatus. A diversity transmission apparatus provided in the embodiments of this application is described by assuming that the diversity transmission method in the embodiments of this application is performed by the diversity transmission apparatus.

Figure 10:
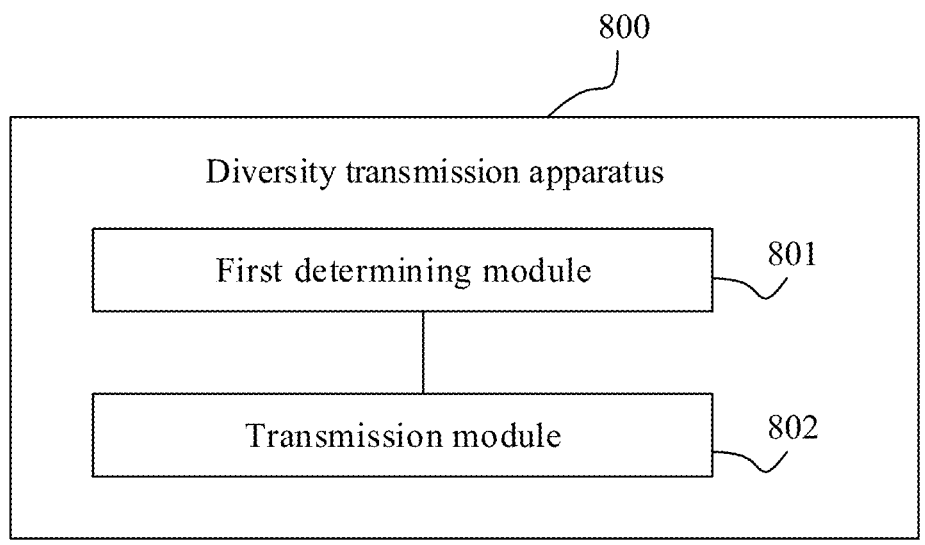
FIG. 10 is a first block diagram of a diversity transmission apparatus according to an embodiment of this application.

FIG. 10 is a first schematic structural diagram of a diversity transmission apparatus according to an embodiment of this application. As shown in FIG. 10, the diversity transmission apparatus 800 is applied to a terminal and includes a first determining module 801 and a transmission module 802.

The first determining module 801 is configured to determine a target encoded codeword; and the transmission module 802 is configured to perform diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

The diversity transmission apparatus provided in this embodiment of this application determines the target encoded codeword meeting the target encoding structure and performs multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in the embodiments of this application can not only ensure a diversity gain, but also reduce types of reflection coefficients required on each antenna, that is, reduce types of load impedances required on each antenna, thereby reducing system implementation complexity and effectively reducing a probability of error detection.

In some implementations, the target encoding structure is represented by S; and $$S = \begin{bmatrix} S_{12} & S_{34}^* \\ S_{34} & -S_{12}^* \end{bmatrix},$$

27 where elements in S include $S_{12}$, $S_{34}$, $S_{34}{}^*$, and $-S_{12}{}^*$; $S_{12}$ is the first basic element, $S_{34}$ is the second basic element, $S_{34}{}^*$ is the second generation element, and $-S_{12}{}^*$ is the first generation element; and $S_{12}$, $S_{34}$, $S_{34}{}^*$, and $-S_{12}{}^*$ meet at least one of the following:

in a case that N is equal to 2, $S_{12}$, $S_{34}$, $S_{34}{}^*$, and $-S_{12}{}^*$ are all complex numbers, $S_{34}{}^*$ is a conjugate complex number of $S_{34}$, and $-S_{12}{}^*$ is an opposite number of a conjugate complex number of $S_{12}$; and in a case that N is greater than 2, $S_{12}$, $S_{34}$, $S_{34}{}^*$, and $-S_{12}{}^*$ are all block matrices with L×L dimensions, L=N/2, elements in each block matrix are all complex numbers, and $1{<}L{<}N$, $S_{34}{}^*$ is a conjugate matrix of $S_{34}$, and $-S_{12}{}^*$ is an opposite number of a conjugate matrix of $S_{12}$.

In some implementations, in a case that N is equal to 2, and $S_{12}{=}s_1$, $S_{34}{=}s_2$, $S_{34}{}^*{=}S_2{}^*$, and $-S_{12}{}^*{=}{-}s_1{}^*$, the target encoded codeword is $S_2$; and $$S_2 = \begin{bmatrix} s_1 & s_2^* \\ s_2 & -s_1^* \end{bmatrix},$$

where elements in $S_2$ are all complex numbers, $s_2{}^*$ is a conjugate complex number of $s_2$, and $-s_1{}^*$ is an opposite number of a conjugate complex number of $s_1$.

In some implementations, in a case that N is equal to 4, and $$S_{12} = \begin{bmatrix} s_1 & s_2^* \\ s_2 & -s_1^* \end{bmatrix},$$

and $$S_{34} = \begin{bmatrix} s_3 & s_4^* \\ s_4 & -s_3^* \end{bmatrix},$$

and $$S_{34}^* = \begin{bmatrix} s_3^* & s_4 \\ s_4^* & -s_3 \end{bmatrix},$$

and $$-S_{12}^* = \begin{bmatrix} -s_1^* & -s_2 \\ -s_2^* & s_1 \end{bmatrix},$$

the target encoded codeword is $S_4$; and $$S_4 = \begin{bmatrix} s_1 & s_2^* & s_3^* & s_4 \\ s_2 & -s_1^* & s_4^* & -s_3 \\ s_3 & s_4^* & -s_1^* & -s_2 \\ s_4 & -s_3^* & -s_2^* & s_1 \end{bmatrix},$$

where elements in $S_4$ are all complex numbers, $s_2{}^*$ is a conjugate complex number of $s_2$, $s_3{}^*$ is a conjugate complex number of $s_3$, $s_4{}^*$ is a conjugate complex number of $s_4$, $-s_1{}^*$ is an opposite number of a conjugate complex number of $s_1$, $-s_2{}^*$ is an opposite number of a conjugate complex number of $s_2$, $-s_3{}^*$ is an opposite number of a conjugate complex number of $s_3$, $-s_2$ is an opposite number of $s_2$, and $-s_3$ is an opposite number of $s_3$.

In some implementations, the first determining module 801 is specifically configured to:

receive first indication information sent by a network-side device, where the first indication information is used to indicate the target encoded codeword; and

determine the target encoded codeword based on the first indication information.

In some implementations, the first indication information includes at least one of the following:

a transmit diversity order and a codeword matrix indicator; and codebook dimension indication information and a codeword matrix indicator.

In some implementations, a manner of carrying the first indication information includes one of the following:

the first indication message is carried by DCI;

the first indication information is carried by a preamble sequence;

the first indication information is carried by a signal sequence, where the signal sequence includes a signal sequence scrambled by a backscatter communication user equipment identity BSC UE ID or a random number related to BSC UE, or a signal sequence carrying a BSC UE ID; and the first indication information is carried by a MAC CE.

In some implementations, the first determining module 801 is specifically configured to determine the target encoded codeword based on capability information and/or channel state information of the terminal.

In some implementations, the diversity transmission apparatus 800 further includes:

a second sending module, configured to send second indication information to a network-side device, where the second indication information is used to indicate the target encoded codeword.

In some implementations, the second indication information includes at least one of the following:

a transmit diversity order and a codeword matrix indicator; and codebook dimension indication information and a codeword matrix indicator.

In some implementations, a manner of carrying the second indication information includes one of the following:

the second indication information is carried by a MAC CE;

the second indication information is carried by a preamble; and the second indication information is carried by a sequence.

In some implementations, the first determining module 801 is specifically configured to determine the target encoded codeword in a case that a first target condition is met.

In some implementations, the diversity transmission apparatus 800 further includes:

a third sending module, configured to send first trigger information to a network-side device in a case that a first target condition is met, where the first trigger information is used to indicate to the network-side device that the terminal triggers diversity transmission.

In some implementations, the first target condition includes at least one of the following:

energy of a back-transmitted signal of the terminal is lower than a first threshold;

the terminal is located at an edge of a cell;

the number of NACKs sent by the terminal exceeds a second threshold; and energy of a downlink received signal is lower than a third threshold.

In some implementations, the diversity transmission apparatus 800 further includes:

a first receiving module, configured to receive second trigger information sent by a network-side device, where the second trigger information is used to trigger diversity transmission of the terminal.

In some implementations, a manner of carrying the second trigger information includes one of the following:

the second trigger message is carried by DCI;

the second trigger information is carried by a preamble sequence;

the second trigger information is carried by a signal sequence, where the signal sequence includes a signal sequence scrambled by a BSC UE ID or a random number related to BSC UE, or a signal sequence carrying a BSC UE ID; and the second trigger information is carried by a MAC CE.

In some implementations, the diversity transmission apparatus 800 further includes:

a second receiving module, configured to receive third indication information sent by a network-side device, where the third indication information is used to instruct the terminal to send measurement reference signals on M transmit antennas; and a fourth sending module, configured to send the measurement reference signals on the M transmit antennas based on the third indication information.

In some implementations, the fourth sending module is specifically configured to:

separately send the measurement reference signals on the M transmit antennas at different times based on the third indication information; or separately send the measurement reference signals on the M transmit antennas at a same time based on the third indication information, where measurement reference signals sent on different transmit antennas have been scrambled by random numbers related to index information of the corresponding antennas.

In some implementations, the third indication information includes at least one of the following:

information used to indicate a time or cycle of a measurement reference signal sent by the terminal on each of the M transmit antennas;

information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

In some implementations, a manner of carrying the third indication information includes one of the following:

the third indication information is carried by DCI;

the third indication information is carried by a preamble sequence;

the third indication information is carried by a signal sequence, where the signal sequence includes a signal sequence scrambled by a BSC UE ID or scrambled by a random number related to BSC UE, or a signal sequence carrying a BSC UE ID; and the third indication information is carried by a MAC CE.

The diversity transmission apparatus in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal 11. The other devices may be a server, a Network Attached Storage (NAS), and the like. This is not specifically limited in this embodiment of this application.

The diversity transmission apparatus provided in this embodiment of this application can implement each process implemented by the method embodiment in FIG. 2, with the same technical effect achieved. To avoid repetition, details are not described herein again.

Figure 11:
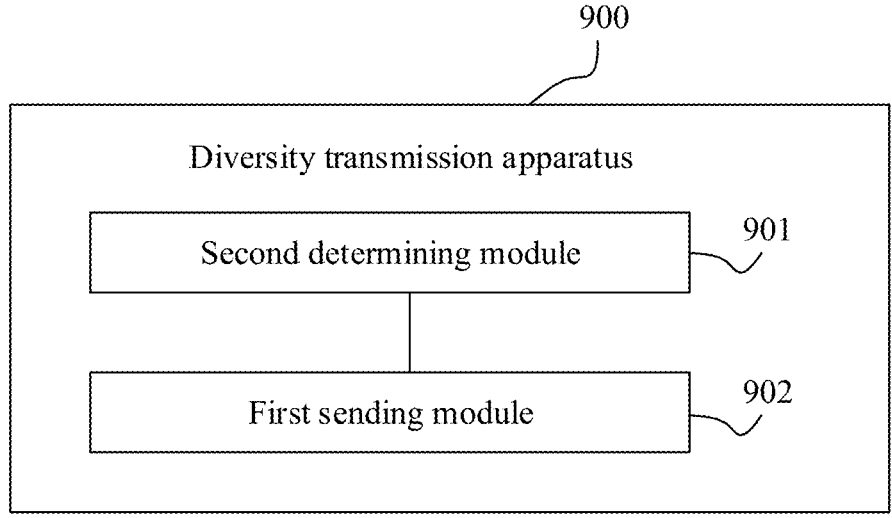
FIG. 11 is a second block diagram of a diversity transmission apparatus according to an embodiment of this application.

FIG. 11 is a second schematic structural diagram of a diversity transmission apparatus according to an embodiment of this application. As shown in FIG. 11, the diversity transmission apparatus 900 is applied to a network-side device and includes a second determining module 901 and a first sending module 902.

The second determining module 901 is configured to determine a target encoded codeword; and the first sending module 902 is configured to send first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

The diversity transmission apparatus provided in this embodiment of this application determines the target encoded codeword meeting the target encoding structure and sends the target encoded codeword to the terminal, to instruct the terminal to perform multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in this embodiment of this application can not only ensure a diversity gain, but also reduce types of reflection coefficients required on each antenna, that is, reduce types of load impedances required on each antenna, thereby reducing system implementation complexity and effectively reducing a probability of error detection.

In some implementations, the first indication information includes at least one of the following:

a transmit diversity order and a codeword matrix indicator; and codebook dimension indication information and a codeword matrix indicator.

In some implementations, a manner of carrying the first indication information includes one of the following:

the first indication message is carried by downlink control information DCI;

the first indication information is carried by a preamble sequence;

the first indication information is carried by a signal sequence, where the signal sequence includes a signal sequence scrambled by a backscatter communication user equipment identity BSC UE ID or a random number related to BSC UE, or a signal sequence carrying a BSC UE ID; and the first indication information is carried by a media access control MAC control element CE.

In some implementations, the second determining module 901 is specifically configured to determine the target encoded codeword based on capability information and/or channel state information of the terminal in a case that a second target condition is met.

In some implementations, the second target condition includes at least one of the following:

energy of a back-transmitted signal of the terminal is lower than a first threshold;

the terminal is located at an edge of a cell;

the number of NACKs sent by the terminal exceeds a second threshold; and the network-side device receives first trigger information sent by the terminal, where the first trigger information is used to indicate to the network-side device that the terminal triggers diversity transmission.

In some implementations, a manner of carrying the first trigger information includes one of the following:

the first trigger information is carried by a preamble sequence;

the first trigger information is carried by a signal sequence, where the signal sequence includes a signal sequence scrambled by a BSC UE ID or a random number related to BSC UE, or a signal sequence carrying a BSC UE ID; and the first trigger information is carried by a MAC CE.

In some implementations, the diversity transmission apparatus 900 further includes:

a fifth sending module, configured to send second trigger information to the terminal in a case that a second target condition is met, where the second trigger information is used to trigger diversity transmission of the terminal.

In some implementations, a manner of carrying the second trigger information includes one of the following:

the second trigger message is carried by DCI;

the second trigger information is carried by a preamble sequence;

the second trigger information is carried by a signal sequence, where the signal sequence includes a signal sequence scrambled by a BSC UE ID or a random number related to BSC UE, or a signal sequence carrying a BSC UE ID; and the second trigger information is carried by a MAC CE.

In some implementations, the diversity transmission apparatus 900 further includes:

a sixth sending module, configured to send third indication information to the terminal in a case that a second target condition is met, where the third indication information is used to instruct the terminal to send measurement reference signals on M transmit antennas.

In some implementations, the third indication information includes at least one of the following:

information used to indicate a time or cycle of a measurement reference signal sent by the terminal on each of the M transmit antennas;

information used to indicate a sequence of the measurement reference signal sent by the terminal on each of the M transmit antennas; and information used to indicate a frequency, a bandwidth, or a frequency shift of the measurement reference signal sent by the terminal on each of the M transmit antennas.

The diversity transmission apparatus provided in this embodiment of this application can implement each process implemented by the method embodiment in FIG. 5, with the same technical effect achieved. To avoid repetition, details are not described herein again.

The diversity transmission apparatus in this embodiment of this application may be an electronic device, or may be a component such as an integrated circuit or a chip in an electronic device. The electronic device may be a terminal, or may be other devices than a terminal. For example, the electronic device may be a mobile phone, a tablet personal computer, a notebook computer, a palmtop computer, an in-vehicle electronic device, a Mobile Internet Device (MID), an Augmented Reality (AR) or Virtual Reality (VR) device, a robot, a wearable device, an Ultra-Mobile Personal Computer (UMPC), a netbook, a Personal Digital Assistant (PDA), or the like; or the electronic device may be a server, a Network Attached Storage (NAS), a personal computer, a television, a teller machine, a self-service machine, or the like. This is not specifically limited in this embodiment of this application.

The diversity transmission apparatus in this embodiment of this application may be an apparatus with an operating system. The operating system may be an Android operating system, an iOS operating system, or other possible operating systems, and is not specifically limited in this embodiment of this application.

Figure 12:
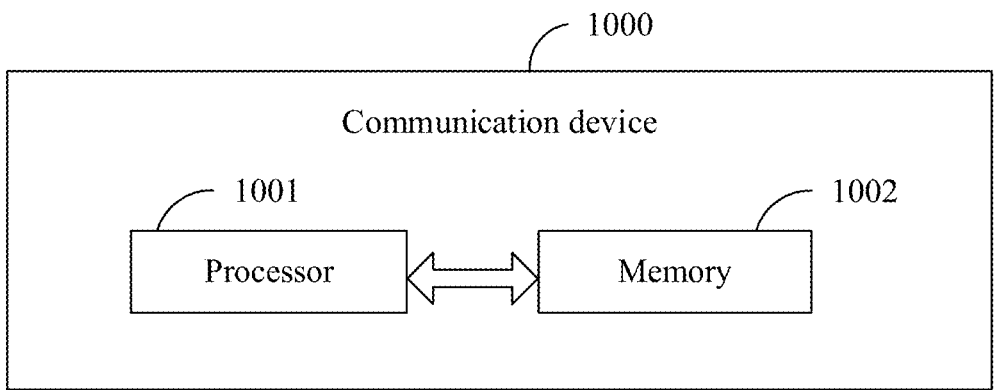
FIG. 12 is a block diagram of a communication device according to an embodiment of this application.

FIG. 12 is a schematic structural diagram of a communication device according to an embodiment of this application. As shown in FIG. 12, the communication device 1000 includes a processor 1001 and a memory 1002. The memory 1002 stores a program or instructions capable of running on the processor 1001. For example, when the communication device 1000 is a terminal, and the program or instructions are executed by the processor 1001, each step of the foregoing embodiment of the diversity transmission method is implemented, with the same technical effect achieved. When the communication device 1000 is a network-side device, and the program or instructions are executed by the processor 1001, each step of the foregoing embodiment of the diversity transmission method is implemented, with the same technical effect achieved. To avoid repetition, details are not described herein again.

An embodiment of this application further provides a terminal, including a processor and a communication interface. The processor is configured to determine a target encoded codeword; and the communication interface is configured to perform diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

The terminal embodiment corresponds to the foregoing terminal-side method embodiment, and each implementation process and implementation of the foregoing method embodiment can be applied to the terminal embodiment, with the same technical effect achieved.

Figure 13:
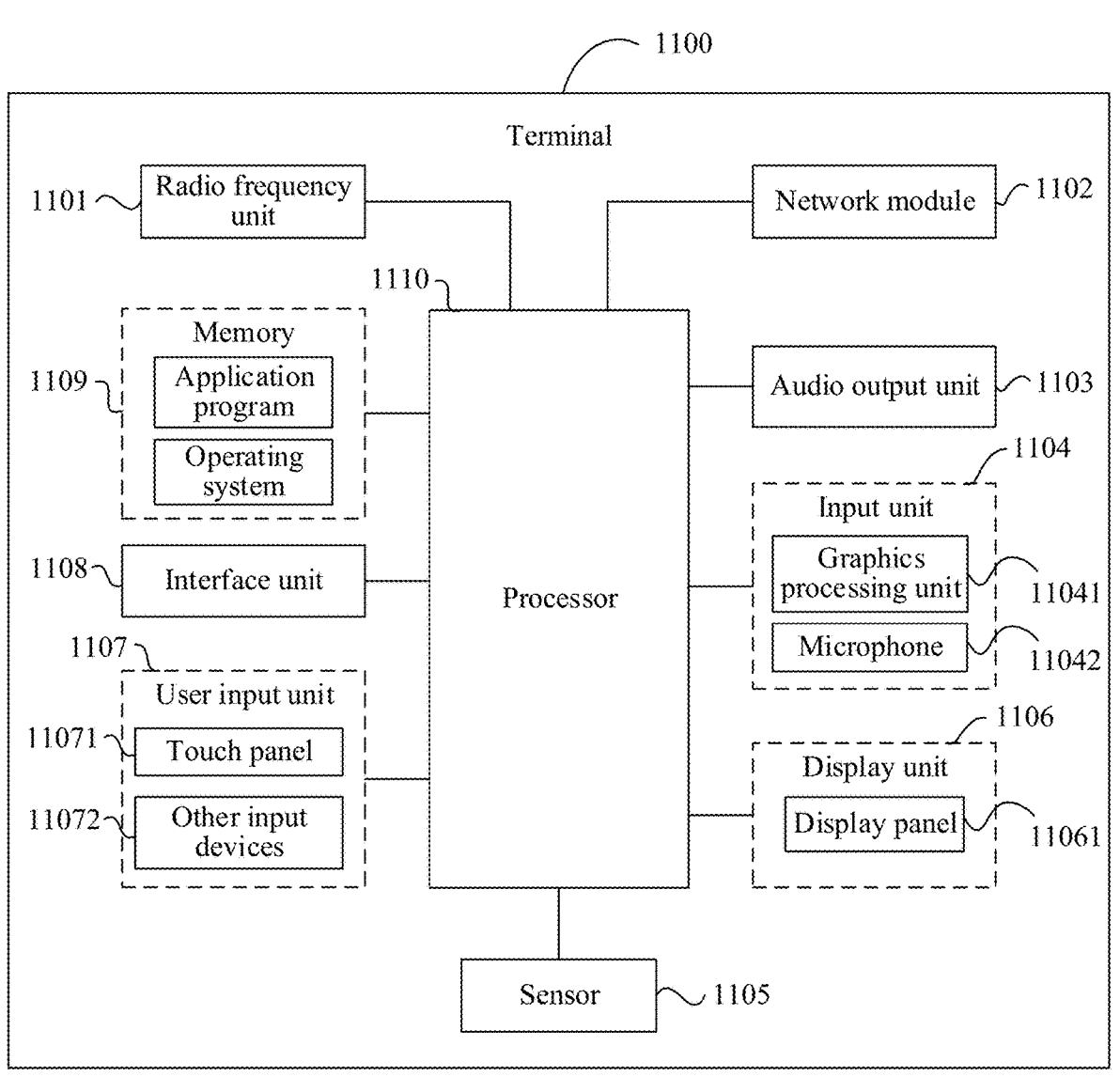
FIG. 13 is a block diagram of a terminal according to an embodiment of this application.

FIG. 13 is a schematic structural diagram of a terminal according to an embodiment of this application. As shown in FIG. 13, the terminal 1100 includes but is not limited to at least some components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (for example, a battery) supplying power to all components. The power supply may be logically connected to the processor 1110 through a power management system. In this way, functions such as charge management, discharge management, and power consumption management are implemented by using the power management system. The terminal structure shown in FIG. 13 does not constitute a limitation on the terminal. The terminal may include more or fewer components than those shown in the figure, or some components are combined, or component arrangements are different. Details are not described herein again.

It should be understood that, in this embodiment of this application, the input unit 1104 may include a Graphics Processing Unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes at least one of a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1101 may transmit the downlink data to the processor 1110 for processing. In addition, the radio frequency unit 1101 may send uplink data to the network-side device. Usually, the radio frequency unit 1101 includes but is not limited to an antenna, an amplifier, a transceiver, a coupler, a low noise amplifier, a duplexer, and the like.

The memory 1109 may be configured to store software programs or instructions and various data. The memory 1109 may primarily include a first storage area for storing programs or instructions and a second storage area for storing data. The first storage area may store an operating system, an application program or instructions required by at least one function (such as an audio play function and an image play function), and the like. In addition, the memory 1109 may include a volatile memory or a non-volatile memory, or the memory 1109 may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR-RAM). The memory 1109 in this embodiment of this application includes but is not limited to these and any other suitable types of memories.

The processor 1110 may include one or more processing units. In some implementations, the processor 1110 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively be not integrated in the processor 1110.

The processor 1110 is configured to determine a target encoded codeword; and the radio frequency unit 1101 is configured to perform diversity transmission based on the target encoded codeword, where the target encoded codeword meets a target encoding structure; the target encoded codeword is an encoding matrix with N×N dimensions; $N=2^k$, and k is a positive integer; the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

The terminal provided in this embodiment of this application determines the target encoded codeword meeting the target encoding structure and performs multi-antenna transmit diversity transmission by using the target encoded codeword, where the target encoded codeword is the encoding matrix with N×N dimensions; the target encoding structure includes the first basic element, the second basic element, the first generation element, and the second generation element; the first generation element is the opposite number of the conjugate operation result of the first basic element, and the second generation element is the conjugate operation result of the second basic element; and the first basic element, the second basic element, the first generation element, and the second generation element are complex numbers or block matrices. In comparison with the related art, the target encoded codeword designed based on the target encoding structure in the embodiments of this application can not only ensure a diversity gain, but also reduce types of reflection coefficients required on each antenna, that is, reduce types of load impedances required on each antenna, thereby reducing system implementation complexity and effectively reducing a probability of error detection.

An embodiment of this application further provides a network-side device, including a processor and a communication interface. The processor is configured to determine a target encoded codeword; and the communication interface is configured to send first indication information to a terminal, where the first indication information is used to indicate the target encoded codeword, where the target encoded codeword meets a target encoding structure; the target encoded codeword is an encoding matrix with N×N dimensions; $N=2^k$, and k is a positive integer;

the target encoding structure includes a first basic element, a second basic element, a first generation element, and a second generation element; the first generation element is an opposite number of a conjugate operation result of the first basic element, and the second generation element is a conjugate operation result of the second basic element; and the first basic element, the second basic element, the first generation element, and the second generation element are complex numbers or block matrices.

The network-side device embodiment corresponds to the foregoing method embodiment of the network-side device, and each implementation process and implementation of the foregoing method embodiment can be applied to the network-side device embodiment, with the same technical effect achieved.

Figure 14:
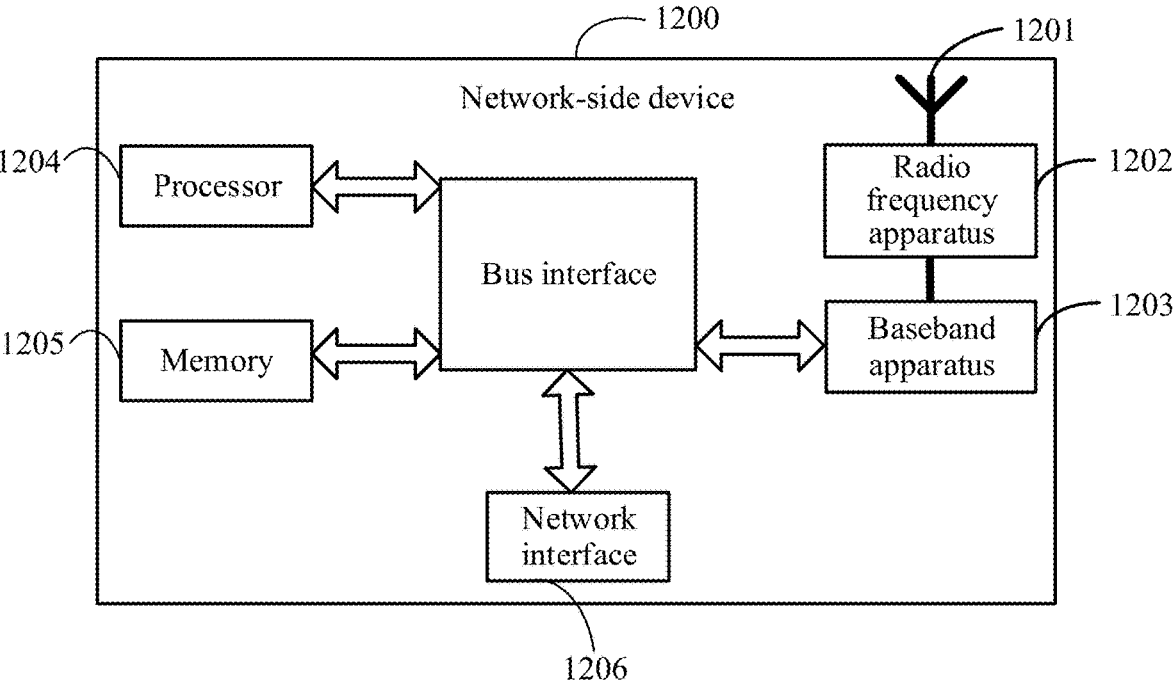
FIG. 14 is a block diagram of a network-side device according to an embodiment of this application.

FIG. 14 is a schematic structural diagram of a network-side device according to an embodiment of this application. As shown in FIG. 14, the network-side device 1200 includes an antenna 1201, a radio frequency apparatus 1202, a baseband apparatus 1203, a processor 1204, and a memory 1205. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes to-be-sent information, and sends the information to the radio frequency apparatus 1202; and the radio frequency apparatus 1202 processes the received information and then sends the information out by using the antenna 1201.

The method performed by the network-side device in the foregoing embodiment may be implemented in the baseband apparatus 1203. The baseband apparatus 1203 includes a baseband processor.

The baseband apparatus 1203 may include, for example, at least one baseband unit, where a plurality of chips are disposed on the baseband unit. As shown in FIG. 14, one of the chips is, for example, the baseband processor, connected to the memory 1205 by using a bus interface, to invoke a program in the memory 1205 to perform the operation of the network-side device shown in the foregoing method embodiment.

The network-side device may further include a network interface 1206, where the interface is, for example, a Common Public Radio Interface (CPRI).

In some implementations, the network-side device 1200 in this embodiment of the present invention further includes a program or instructions stored in the memory 1205 and capable of running on the processor 1204. When the processor 1204 invokes the program or instructions in the memory 1205, the method performed by each module shown in FIG. 9 is performed, with the same technical effect achieved. To avoid repetition, details are not described herein again.

An embodiment of this application further provides a diversity transmission system, including a terminal and a network-side device. The terminal may be configured to perform the steps of the foregoing diversity transmission method. The network-side device may be configured to perform the steps of the foregoing diversity transmission method.

An embodiment of this application further provides a readable storage medium. The readable storage medium may be volatile or non-volatile. The readable storage medium stores a program or instructions. When the program or instructions are executed by a processor, each process of the foregoing embodiment of the diversity transmission method is implemented, with the same technical effect achieved. To avoid repetition, details are not described herein again.

The processor is a processor in the terminal in the foregoing embodiment. The readable storage medium includes a computer-readable storage medium, such as a computer ROM, a RAM, a magnetic disk, or an optical disc.

In addition, an embodiment of this application provides a chip. The chip includes a processor and a communication interface. The communication interface is coupled to the processor. The processor is configured to run a program or instructions to implement each process of the embodiment of the diversity transmission method, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program or program product. The computer program or program product is stored in a storage medium. The computer program or program product is executed by at least one processor to implement each process of the foregoing embodiment of the diversity transmission method, with the same technical effect achieved. To avoid repetition, details are not described herein again.

It should be noted that in this specification, the term "comprise," "include," or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A diversity transmission method, performed by a terminal, comprising:

determining a target codeword; and performing diversity transmission based on the target codeword, wherein:

the target codeword meets a target encoding structure; the target codeword is an encoding matrix with N×N dimensions; $N=2^k$, and k is a positive integer;

the target encoding structure comprises a first basic element, a second basic element, a first generation element, and a second generation element;

the first generation element is an opposite number of a conjugate operation result of the first basic element, and the second generation element is a conjugate operation result of the second basic element; and the first basic element, the second basic element, the first generation element, and the second generation element are complex numbers or block matrices, wherein the determining a target codeword comprises:

receiving first indication information sent by a network-side device, wherein the first indication information is used to indicate the target codeword, and determining the target codeword based on the first indication information;

or determining, by the terminal, the target codeword based on capability information or channel state information of the terminal.

2. The diversity transmission method according to claim 1, wherein the target encoding structure is represented by S; and $$S = \begin{bmatrix} S_{12} & S_{34}^* \\ S_{34} & -S_{12}^* \end{bmatrix},$$

wherein elements in S comprise $S_{12}$, $S_{34}$, $S_{34}^*$, and $-S_{12}^*$; $S_{12}$ is the first basic element, $S_{34}$ is the second basic element, $S_{34}^*$ is the second generation element, and $-S_{12}$ is the first generation element; and $S_{12}$, $S_{34}$, $S_{34}^*$, and $-S_{12}^*$ meet at least one of the following:

when N is equal to 2, $S_{12}$, $S_{34}$, $S_{34}^*$, and $-S_{12}^*$ are all complex numbers, $S_{34}^*$ is a conjugate complex number of $S_{34}$, and $-S_{12}^*$ is an opposite number of a conjugate complex number of $S_{12}$; or when N is greater than 2, $S_{12}$, $S_{34}$, $S_{34}^*$, and $-S_{12}^*$ are all block matrices with L×L dimensions, L=N/2, elements in each block matrix are all complex numbers, and $1 < L < N$, $S_{34}^*$ is a conjugate matrix of $S_{34}$, and $-S_{12}^*$ is an opposite number of a conjugate matrix of $S_{12}$.

3. The diversity transmission method according to claim 2, wherein when N is equal to 4, and $$S_{12} = \begin{bmatrix} s_1 & s_2^* \\ s_2 & -s_1^* \end{bmatrix},$$

-continued
and $$S_{34} = \begin{bmatrix} s_3 & s_4^* \\ s_4 & -s_3^* \end{bmatrix},$$

and $$S_{34}^* = \begin{bmatrix} s_3^* & s_4 \\ s_4^* & -s_3 \end{bmatrix},$$

and $$-S_{12}^* = \begin{bmatrix} -s_1^* & -s_2 \\ -s_2^* & s_1 \end{bmatrix},$$

the target codeword is $S_4$; and $$S_4 = \begin{bmatrix} s_1 & s_2^* & s_3^* & s_4 \\ s_2 & -s_1^* & s_4^* & -s_3 \\ s_3 & s_4^* & -s_1^* & -s_2 \\ s_4 & -s_3^* & -s_2^* & s_1 \end{bmatrix},$$

wherein elements in $S_4$ are all complex numbers, $s_2^*$ is a conjugate complex number of $s_2$, $s_3^*$ is a conjugate complex number of $s_3$, $s_4^*$ is a conjugate complex number of $s_4$, $-s_1^*$ is an opposite number of a conjugate complex number of $s_1$, $-s_2^*$ is an opposite number of a conjugate complex number of $s_2$, $-s_3^*$ is an opposite number of a conjugate complex number of $s_3$, $-s_2$ is an opposite number of $s_2$, and $-s_3$ is an opposite number of $s_3$.

4. The diversity transmission method according to claim 1, wherein the first indication information comprises at least one of the following:

a transmit diversity order and a codeword matrix indicator; or codebook dimension indication information and a codeword matrix indicator.

5. The diversity transmission method according to claim 1, wherein a manner of carrying the first indication information comprises one of the following:

the first indication information is carried by Downlink Control Information (DCI);

the first indication information is carried by a preamble sequence;

the first indication information is carried by a signal sequence, wherein the signal sequence comprises a signal sequence scrambled by a Backscatter Communication User Equipment IDentity (BSC UE ID) or a random number related to BSC UE, or a signal sequence carrying a BSC UE ID; or the first indication information is carried by a Media Access Control (MAC) Control Element (CE).

6. The diversity transmission method according to claim 1, wherein the method further comprises:

sending second indication information to a network-side device, wherein the second indication information is used to indicate the target codeword.

7. The diversity transmission method according to claim 6, wherein the second indication information comprises at least one of the following:

a transmit diversity order and a codeword matrix indicator; or codebook dimension indication information and a codeword matrix indicator.

8. The diversity transmission method according to claim 6, wherein a manner of carrying the second indication information comprises one of the following:

the second indication information is carried by a Media Access Control (MAC) Control Element (CE);

the second indication information is carried by a preamble; or the second indication information is carried by a sequence.

9. The diversity transmission method according to claim 1, wherein the determining a target codeword comprises:

when a first target condition is met, determining the target codeword.

10. The diversity transmission method according to claim 9, wherein the first target condition comprises at least one of the following:

energy of a back-transmitted signal of the terminal is lower than a first threshold;

the terminal is located at an edge of a cell;

the number of Negative ACKnowledgements (NACKs) sent by the terminal exceeds a second threshold; or energy of a downlink received signal is lower than a third threshold.

11. The diversity transmission method according to claim 1, wherein the method further comprises:

when a first target condition is met, sending first trigger information to a network-side device, wherein the first trigger information is used to indicate to the network-side device that the terminal triggers diversity transmission.

12. The diversity transmission method according to claim 11, wherein a manner of carrying the first trigger information comprises one of the following:

the first trigger information is carried by a preamble sequence;

the first trigger information is carried by a signal sequence, wherein the signal sequence comprises a signal sequence scrambled by a Backscatter Communication User Equipment IDentity (BSC UE ID) or a random number related to BSC UE, or a signal sequence carrying a BSC UE ID; or the first trigger information is carried by a Media Access Control (MAC) Control Element (CE).

13. The diversity transmission method according to claim 1, wherein the method further comprises:

receiving, by the terminal, second trigger information sent by a network-side device, wherein the second trigger information is used to trigger diversity transmission of the terminal.

14. The diversity transmission method according to claim 13, wherein a manner of carrying the second trigger information comprises one of the following:

the second trigger information is carried by Downlink Control Information (DCI);

the second trigger information is carried by a preamble sequence;

the second trigger information is carried by a signal sequence, wherein the signal sequence comprises a signal sequence scrambled by a Backscatter Communication User Equipment IDentity (BSC UE ID) or a random number related to BSC UE, or a signal sequence carrying a BSC UE ID; or the second trigger information is carried by a Media Access Control (MAC) Control Element (CE).

15. The diversity transmission method according to claim 1, wherein the method further comprises:

receiving third indication information sent by a network-side device, wherein the third indication information is used to instruct the terminal to send measurement reference signals on M transmit antennas; and sending the measurement reference signals on the M transmit antennas based on the third indication information.

16. The diversity transmission method according to claim 15, wherein the sending the measurement reference signals on the M transmit antennas based on the third indication information comprises:

separately sending the measurement reference signals on the M transmit antennas at different times based on the third indication information; or separately sending the measurement reference signals on the M transmit antennas at a same time based on the third indication information, wherein measurement reference signals sent on different transmit antennas have been scrambled by random numbers related to index information of the corresponding antennas.

17. The diversity transmission method according to claim 15, wherein the third indication information comprises at least one of the following:

information used to indicate a time or cycle of a measurement reference signal sent by the terminal on each of the M transmit antennas;

information used to indicate a sequence of the measurement reference signal sent by the terminal on each of the M transmit antennas; or information used to indicate a frequency, a bandwidth, or a frequency shift of the measurement reference signal sent by the terminal on each of the M transmit antennas.

18. The diversity transmission method according to claim 15, wherein a manner of carrying the third indication information comprises one of the following:

the third indication information is carried by Downlink Control Information (DCI);

the third indication information is carried by a preamble sequence;

the third indication information is carried by a signal sequence, wherein the signal sequence comprises a signal sequence scrambled by a Backscatter Communication User Equipment IDentity (BSC UE ID) or scrambled by a random number related to BSC UE, or a signal sequence carrying a BSC UE ID; or the third indication information is carried by a Media Access Control (MAC) Control Element (CE).

* * * * *